(12) United States Patent
Ozawa et al.

(10) Patent No.: US 9,027,069 B2
(45) Date of Patent: May 5, 2015

(54) CONTENT PLAYBACK DEVICE, METHOD FOR PLAYING BACK CONTENT AND CONTENT DELIVERY SYSTEM

(75) Inventors: Yuka Ozawa, Osaka (JP); Toru Kawaguchi, Tokyo (JP); Toshihiko Munetsugu, Osaka (JP); Takuji Hiramoto, Osaka (JP); Hiroshi Yahata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 78 days.

(21) Appl. No.: 13/978,093

(22) PCT Filed: Jul. 12, 2012

(86) PCT No.: PCT/JP2012/004497
§ 371 (c)(1),
(2), (4) Date: Jul. 2, 2013

(87) PCT Pub. No.: WO2013/011670
PCT Pub. Date: Jan. 24, 2013

(65) Prior Publication Data
US 2013/0291025 A1    Oct. 31, 2013

Related U.S. Application Data

(60) Provisional application No. 61/510,139, filed on Jul. 21, 2011.

(51) Int. Cl.
*H04N 7/173* (2011.01)
*H04N 21/482* (2011.01)
(Continued)

(52) U.S. Cl.
CPC ......... *H04N 21/482* (2013.01); *H04N 21/6587* (2013.01); *H04N 13/0055* (2013.01);
(Continued)

(58) Field of Classification Search
CPC .................................................. H04N 21/4722
USPC ........................................ 725/61, 93–95, 110
See application file for complete search history.

(56) References Cited

U.S. PATENT DOCUMENTS

2003/0236895 A1    12/2003    Ohkubo et al.
2008/0310499 A1*   12/2008    Kim et al. ................ 375/240.01
2011/0273541 A1    11/2011    Kitazato

FOREIGN PATENT DOCUMENTS

| JP | 2004-13283 | 1/2004 |
| JP | 2005-244948 | 9/2005 |
| JP | 2007-43562 | 2/2007 |
| JP | 2011-82666 | 4/2011 |

OTHER PUBLICATIONS

International Search Report issued Sep. 25, 2012 in International (PCT) Application No. PCT/JP2012/004497.
Coding, Transmission and Storage Specification for Broadcasting System Based on Home Servers ARIB, ARIB STD-B38 Ver. 2.0, by Association of Radio Industries and Businesses (Apr. 26, 2010) along with partial translation pp. 70-71, pp. 181-197 (in English).

(Continued)

*Primary Examiner* — Hunter B Lonsberry
(74) *Attorney, Agent, or Firm* — Wenderoth, Lind & Ponack, L.L.P.

(57) ABSTRACT

A content playback device reduces user discomfort, relative to conventional devices, when playback is interrupted and resumed after switching viewing modes, pieces of content representing different viewing modes for a common product, and differing in video length or having other differences. The content playback device receives and plays back streaming content from a content server delivering two pieces of content having different viewing modes for the common product, and comprises: a selection unit selecting a viewing mode; a determination unit determining whether playback of a first piece of content not having the selected viewing mode was interrupted; a conversion unit converting, when the determination unit has determined affirmatively, a playback interrupt position into a corresponding position in a second piece of content having the selected viewing mode; and a request unit making a request to the content server for transmission of the second piece of content from the corresponding position.

9 Claims, 26 Drawing Sheets

(51) Int. Cl.
  *H04N 21/6587* (2011.01)
  *H04N 13/00* (2006.01)
  *H04N 21/2343* (2011.01)
  *H04N 21/262* (2011.01)
  *H04N 21/81* (2011.01)
  *H04N 21/845* (2011.01)
  *H04N 21/8543* (2011.01)

(52) U.S. Cl.
  CPC ..... *H04N13/0066* (2013.01); *H04N 21/23439* (2013.01); *H04N 21/26258* (2013.01); *H04N 21/816* (2013.01); *H04N 21/8456* (2013.01); *H04N 21/8543* (2013.01)

(56) References Cited

OTHER PUBLICATIONS

IPTV Standard, CDN Scope Service Approach Specifications, IPTVFJ STD-0006 Version 1.3, pp. 389-406, 347-350, 296-297, 56 and 365, Jul. 30, 2010, along with English translation pp. 397-414, 342-347, 292-293, 57 and 367.

IPTV Standard, VOD Specifications, IPTVFJ STD-0002, Version 1.2 along with English translation (Version 1.1) p. 16, Jul. 30, 2010.

Streaming Functional Specifications in Digital Television Network Functional Specifications, Codec Part, Revision 1.2, Digital Television Information Study Group, Dec. 21, 2010 along with partial translation.

\* cited by examiner

FIG.3

| CRID | Viewing Mode | Related CRID |
|---|---|---|
| crid://aaa.ne.jp/content/ABCDE0000 | 3D | crid://aaa.ne.jp/content/ABCDE0001 |
| crid://aaa.ne.jp/content/ABCDE0001 | 2D | crid://aaa.ne.jp/content/ABCDE0000 |
| crid://aaa.ne.jp/content/ABCDE0002 | 2D | — |
| ⋮ | ⋮ | ⋮ |

```
<?xml version="1.0" encoding="UTF-8"?>
<TVAMain>
<ProgramDescription>
<ProgramInformationTable>
<ProgramInformation
  programId= "crid://aaa.ne.jp/content/ABCDE0000"
  fragmentId="0000000001"
  fragmentVersion="20110712142509">
<BasicDescription>
<Title type="main">3D Action Movie A</Title>
...
<RelatedMaterial>
<HowRelated
href="http://www.iptvforum.jp/cs/2011/07/IPTVSERVICEHow
RelatedCS:22.1"/>
<mpeg7:MediaLocator>
<mpeg7:MediaUri>crid://aaa.ne.jp/content/ABCDE0001
</mpeg7:MediaUri>
</mpeg7:MediaLocator>
</RelatedMaterial>

...
<VideoAttributes>
<coding>...</coding>
...
</ProgramInformation>
    </ProgramInformationTable>
  </ProgramDescription>
</TVAMain>
```

FIG.5

```
<?xml version="1.0" encoding="UTF-8"?>
<TVAMain>
<ProgramDescription>
<ProgramInformationTable>
<ProgramInformation
  programId="crid://aaa.ne.jp/content/ABCDE0001"
  fragmentId="0000000001"
  fragmentVersion="20110712142509">
<BasicDescription>
<Title type="main">Action Movie A</Title>
...
<RelatedMaterial>
<HowRelated
href="http://www.iptvforum.jp/cs/2011/07/IPTVSERVICEHow
RelatedCS:22.2"/>
<mpeg7:MediaLocator>
<mpeg7:MediaUri>crid://aaa.ne.jp/content/ABCDE0000
</mpeg7:MediaUri>
</mpeg7:MediaLocator>
</RelatedMaterial>

...
<VideoAttributes>
<coding>http://www.arib.or.jp/cs/2008/07/IPTVSERVICEVisualCod
ingFormatCS:1</coding>
...
</ProgramInformation>
    </ProgramInformationTable>
  </ProgramDescription>
</TVAMain>
```

```
<ClassificationScheme
uri="http://www.iptvforum.jp/cs/2011/07/IPTVSERVICEHowRelated
CS">
<Term termID="1">
<Name xml:lang="en">Trailer</Name>
<Definition xml:lang="en">
Relation: Audiovisual content is trailer for program associated with CRID
</Definition>
</Term>
.
.
.

<Term termID="21">
<Name xml:lang="en">Package reference</Name>
<Definition xml:lang="en">Relation: Reference to group information
element describing package
</Definition>
</Term>

<Term termID="22.1">
<Name xml:lang="en">2D</Name>
<Definition xml:lang="en">Relation: Alternate viewing mode for current
piece of content (2D video)
</Definition>
</Term>
<Term termID="22.2">
<Name xml:lang="en"> 3D_stereoscopic </Name>
<Definition xml:lang="en">Relation: Alternate viewing mode for current
piece of content (Stereoscopic 3D)
</Definition>
</Term>

</ClassificationScheme>
```

```
<?xml version="1.0" encoding="UTF-8"?>
<eri>
...
<content_title>3D Action Movie A</content_title>
...
<content_chapter_info>
  <chapter   number ="1">
    <chapter_point>00000</chapter_point>
    <chapter_title>Scene A</chapter_title>
    <chapter_thumbnail_uri>・・・/thumb01.jpg</chapter_thumbnail_uri>
  </chapter>
  <chapter   number ="2">
    <chapter_point>00301</chapter_point>
    <chapter_title>Scene B</chapter_title>
    <chapter_thumbnail_uri>・・・/thumb02.jpg</chapter_thumbnail_uri>
  </chapter>
  <chapter   number ="3">
    <chapter_point>00501</chapter_point>
    <chapter_title>Scene C</chapter_title>
    <chapter_thumbnail_uri>・・・/thumb03.jpg</chapter_thumbnail_uri>
  </chapter>
  <chapter   number ="4">
    <chapter_point>00701</chapter_point>
    <chapter_title>Scene D</chapter_title>
    <chapter_thumbnail_uri>・・・/thumb04.jpg</chapter_thumbnail_uri>
  </chapter>
  <chapter   number ="5">
    <chapter_point>01101</chapter_point>
    <chapter_title>Scene E</chapter_title>
    <chapter_thumbnail_uri>・・・/thumb05.jpg</chapter_thumbnail_uri>
  </chapter>
  ...
</content_chapter_info>
...
</eri>
```

```
<?xml version="1.0" encoding="UTF-8"?>
<eri>
...
<content_title>Action Movie A</content_title>
...
<content_chapter_info>
  <chapter  number ="1">
    <chapter_point>00000</chapter_point>
    <chapter_title>Scene A</chapter_title>
    <chapter_thumbnail_uri>・・・/thumb01.jpg</chapter_thumbnail_uri>
  </chapter>
  <chapter  number ="2">
    <chapter_point>00301</chapter_point>
    <chapter_title></chapter_title>
    <chapter_thumbnail_uri></chapter_thumbnail_uri>
  </chapter>
  <chapter  number ="3">
    <chapter_point>00301</chapter_point>
    <chapter_title>Scene C</chapter_title>
    <chapter_thumbnail_uri>・・・/thumb03.jpg</chapter_thumbnail_uri>
  </chapter>
  <chapter  number ="4">
    <chapter_point>00501</chapter_point>
    <chapter_title>Scene D'</chapter_title>
    <chapter_thumbnail_uri>・・・/thumb04.jpg</chapter_thumbnail_uri>
  </chapter>
  <chapter  number ="5">
    <chapter_point>00701</chapter_point>
    <chapter_title>Scene E</chapter_title>
    <chapter_thumbnail_uri>・・・/thumb05.jpg</chapter_thumbnail_uri>
  </chapter>
  ...
</content_chapter_info>
...
</eri>
```

FIG.11

| User ID | CRID | Device ID | Viewing Mode Information | Playback Interrupt Position Information |
|---------|------|-----------|--------------------------|------------------------------------------|
| U01 | crid://aaa.ne.jp/content/ABCDE0000 | D01 | 3D | 400 |
|  | crid://aaa.ne.jp/content/ABCDE0002 | D03 | 2D | — |
|  | ... | ... | ... | ... |
| U02 | crid://aaa.ne.jp/content/ABCDE0010 | D11 | 2D | 6000 |
| ... | ... | ... | ... | ... |

| CRID | Viewing Mode | Playback Interrupt Position | Related CRID |
|---|---|---|---|
| crid://aaa.ne.jp/content/ABCDE0000 | 3D | 400 | crid://aaa.ne.jp/content/ABCDE0001 |
| crid://aaa.ne.jp/content/ABCDE0002 | 2D | 1500 | — |

FIG.13B

| CRID | Viewing Mode | Playback Interrupt Position | Related CRID |
|---|---|---|---|
| crid://aaa.ne.jp/content/ABCDE0000 | 3D | 400 | crid://aaa.ne.jp/content/ABCDE0001 |
| crid://aaa.ne.jp/content/ABCDE0001 | 2D | — | crid://aaa.ne.jp/content/ABCDE0000 |
| crid://aaa.ne.jp/content/ABCDE0002 | 2D | 1500 | — |

FIG.21

| crid://aaa.ne.jp/content/ABCDE0000 | crid://aaa.ne.jp/content/ABCDE0001 |
|---|---|
| 0 | 0 |
| 100 | 100 |
| 200 | 200 |
| 300 | — |
| 400 | — |
| 500 | 300 |
| 600 | 400 |
| 700 | 500 |
| 800 | 550 |
| 900 | 600 |
| 1000 | 650 |
| 1100 | 700 |

```
<?xml version="1.0" encoding="UTF-8"?>
<eri>
...
<content_title>Action Movie A</content_title>
...
<content_chapter_info>
  <chapter  number ="1">
    <chapter_point>00000</chapter_point>
    <chapter_title>Scene A</chapter_title>
    <chapter_thumbnail_uri>・・・/thumb01.jpg</chapter_thumbnail_uri>
  </chapter>
  <chapter  number ="3">
    <chapter_point>00301</chapter_point>
    <chapter_title>Scene C</chapter_title>
    <chapter_thumbnail_uri>・・・/thumb03.jpg</chapter_thumbnail_uri>
  </chapter>
  <chapter  number ="4">
    <chapter_point>00501</chapter_point>
    <chapter_title>Scene D'</chapter_title>
    <chapter_thumbnail_uri>・・・/thumb04.jpg</chapter_thumbnail_uri>
  </chapter>
  <chapter  number ="5">
    <chapter_point>00701</chapter_point>
    <chapter_title>Scene E</chapter_title>
    <chapter_thumbnail_uri>・・・/thumb05.jpg</chapter_thumbnail_uri>
  </chapter>
...
</content_chapter_info>
...
</eri>
```

FIG.23

```
<?xml version="1.0" encoding="UTF-8"?>
<eri>
...
<content_title>Action Movie A</content_title>
...
<content_chapter_info>
  <chapter  number ="1">
    <chapter_point>00000</chapter_point>
    <chapter_title>Scene A</chapter_title>
    <chapter_thumbnail_uri>・・・/thumb01.jpg</chapter_thumbnail_uri>
  </chapter>
  <chapter  number ="2"  invalid="1"   >          ← 2301
    <chapter_point>00301</chapter_point>
    <chapter_title></chapter_title>
    <chapter_thumbnail_uri></chapter_thumbnail_uri>
  </chapter>
  <chapter  number ="3">
    <chapter_point>00301</chapter_point>
    <chapter_title>Scene C</chapter_title>
    <chapter_thumbnail_uri>・・・/thumb03.jpg</chapter_thumbnail_uri>
  </chapter>
  <chapter  number ="4">
    <chapter_point>00501</chapter_point>
    <chapter_title>Scene D'</chapter_title>
    <chapter_thumbnail_uri>・・・/thumb04.jpg</chapter_thumbnail_uri>
  </chapter>
  <chapter  number ="5">
    <chapter_point>00701</chapter_point>
    <chapter_title>Scene E</chapter_title>
    <chapter_thumbnail_uri>・・・/thumb05.jpg</chapter_thumbnail_uri>
  </chapter>
  ...
</content_chapter_info>
...
</eri>
```

FIG.24

```
...
<SegmentInformationTable>
 <SegmenList>

<SegmentInformation>
   <Description>
     <title>Scene A</title>
   </Description>
   <SegmentLocator>00000</SegmentLocator>
  </SegmentInformation>

<SegmentInformation>
   <Description>
     <title>Scene B</title>
   </Description>
   <SegmentLocator>00301</SegmentLocator>
  </SegmentInformation>

<SegmentInformation>
   <Description>
     <title>Scene C</title>
   </Description>
   <SegmentLocator>00501</SegmentLocator>
  </SegmentInformation>
...
```

```
...
<SegmentInformationTable>                    2501
 <SegmenList>

<SegmentInformation>
   <Description>
     <title>Scene A</title>
   </Description>
   <SegmentLocator>00000</SegmentLocator>
 </SegmentInformation>

<SegmentInformation>
   <Description>
     <title></title>
   </Description>
   <SegmentLocator>00301</SegmentLocator>
 </SegmentInformation>

<SegmentInformation>
   <Description>
     <title>Scene C</title>
   </Description>
   <SegmentLocator>00301</SegmentLocator>
 </SegmentInformation>
...
```

FIG.26

```
...
<SegmentInformationTable>
 <SegmenList>

<SegmentInformation>
   <Description>
    <title>Scene A</title>
    <RelatedMaterial>
     <HowRelated href="http://www.iptvforum.jp/cs/2011/07/IPTV SERVICEHowRelatedCS:22.2"/>
     <mpeg7:MediaLocator>

<mpeg7:MediaUri>crid://aaa.ne.jp/content/ABCDE0001/Segment
InformationTable/SegmentInformation/1
      </mpeg7:MediaUri>

</mpeg7:MediaLocator>
    </RelatedMaterial>
   </Description>
   <SegmentLocator>00000</SegmentLocator>
  </SegmentInformation>

<SegmentInformation>
   <Description>
    <title>Scene B</title>
   </Description>
   <SegmentLocator>00301</SegmentLocator>
  </SegmentInformation>
...
```

2601

CONTENT PLAYBACK DEVICE, METHOD FOR PLAYING BACK CONTENT AND CONTENT DELIVERY SYSTEM

This application claims benefit to the U.S. Provisional Application No. 61/510,139, filed Jul. 21, 2011.

TECHNICAL FIELD

The present disclosure pertains to technology for receiving and playing back a content stream, and in particular, to switching between viewing modes during content playback.

BACKGROUND ART

Internet Protocol Television (hereinafter, IPTV) is exploring the delivery of encoded content using Multiview Video Coding (hereinafter, MVC) in which 3D video is multiplexed such that a left-view video serves as a base view and a right-view video serves as a dependent view. The MVC scheme has the base view serve as both the left-view video and as a 2D video, such that 2D video playback is possible by extracting the base view alone. Patent Literature 1 discloses technology for embedding, within a stream, control information that indicates a period in which switching a viewing mode between 2D and 3D is possible, thus enabling a switch between viewing modes during the period.

When a piece of content is playable in either of a 3D viewing mode and a 2D viewing mode, the user may plausibly decide to switch from one viewing mode to another viewing mode, while playback is in progress. For example, a user who begins to view a piece of content in 3D using 3D glasses may wish to continue viewing in the company of a second user who does not have 3D glasses, or may begin viewing a piece of content in 2D and then wish to view subsequent visually-impressive scenes in 3D.

When the viewing mode is changed while playback is in progress, the piece of content is encoded according the aforementioned MVC scheme, and the 3D video and 2D video are similar enough to differ only in whether or not a stereoscopic effect is possible, the user is unlikely to experience discomfort when changing the viewing mode.

CITATION LIST

Patent Literature

[Patent Literature 1]
Japanese Patent Application Publication No. 2011-82666

SUMMARY OF INVENTION

Technical Problem

As it happens, when individual pieces of content that represent a common product are created so as to provide a piece of 3D content and a piece of 2D content, differences in camera work, editing, and so on may result in the pieces of content having different lengths or containing non-identical scenes.

In such circumstances, a problem arises when a piece of content is undergoing playback, playback is interrupted at a given chronological position, and the viewing mode is changed before resuming playback from the given chronological position, in other words, when the piece of content subject to playback is changed to another piece of content having a different viewing mode for a common product. Specifically, the problem is that the video at the position where playback was interrupted may be completely different from the video at an equivalent position in the other piece of content, thus causing discomfort to the user.

As such, in consideration of the above problem, the present disclosure aims to provide a content playback device that reduces discomfort to the user, relative to conventional devices, when playback is interrupted and resumed after switching to another viewing mode, in a case where the pieces of content represent different viewing modes for a common product and differ in terms of video length, or have other partial differences.

Solution to Problem

In order to solve the above-described problem, a content playback device receives and plays back streaming content from a content server delivering two pieces of content each having a different viewing mode for a common product, the content playback device comprising: a selection unit selecting a viewing mode; a determination unit determining whether or not playback of a first piece of content has been interrupted, the first piece of content having another viewing mode that is not the selected viewing mode; a conversion unit converting, when the determination unit has determined that playback of the first piece of content has been interrupted, a position at which playback of the first piece of content has been interrupted into a corresponding position in a second piece of content having the selected viewing mode; and a request unit making a request to the content server for transmission of the second piece of content beginning at the corresponding position.

Advantageous Effects of Invention

According to the above configuration, the content playback device pertaining to the disclosure resumes playback from a corresponding position in the second piece of content that corresponds to the position in the first piece of content at which playback was interrupted. Thus, the video prior to playback being interrupted corresponds to the video at which playback is resumed, providing less discomfort to the user than conventional technology.

BRIEF DESCRIPTION OF DRAWINGS

FIG. 3 indicates an example of a related content table.

FIG. 4 indicates an example of a PI.

FIG. 5 indicates an example of a PI for a piece of related content.

FIG. 6 indicates an example of an HR dictionary.

FIG. 9 indicates an ERI for transmitting a portion of the playback position correspondence table pertaining to 3D content A (i.e., 3D Action Movie A).

FIG. 10 indicates an ERI for transmitting a portion of the playback position correspondence table pertaining to 2D content A (i.e., Action Movie A).

FIG. 11 indicates an example of interrupt position information table.

FIG. 13A indicates an example of viewing condition information, and FIG. 13B indicates another example of viewing condition information.

FIG. 21 indicates an example of a playback position correspondence table pertaining to a variation.

FIG. 22 indicates an ERI pertaining to a variation.

FIG. 23 indicates another ERI pertaining to a variation.

FIG. 24 indicates an example of a SegmentInformationTable for 3D Action Movie A, pertaining to a variation.

FIG. 25 indicates an example of a SegmentInformationTable for Action Movie A, pertaining to a variation.

FIG. 26 indicates an example of a RelatedMaterial element in a SegmentInformationTable pertaining to a variation.

DESCRIPTION OF EMBODIMENT (1. Outline)

Figure 1:
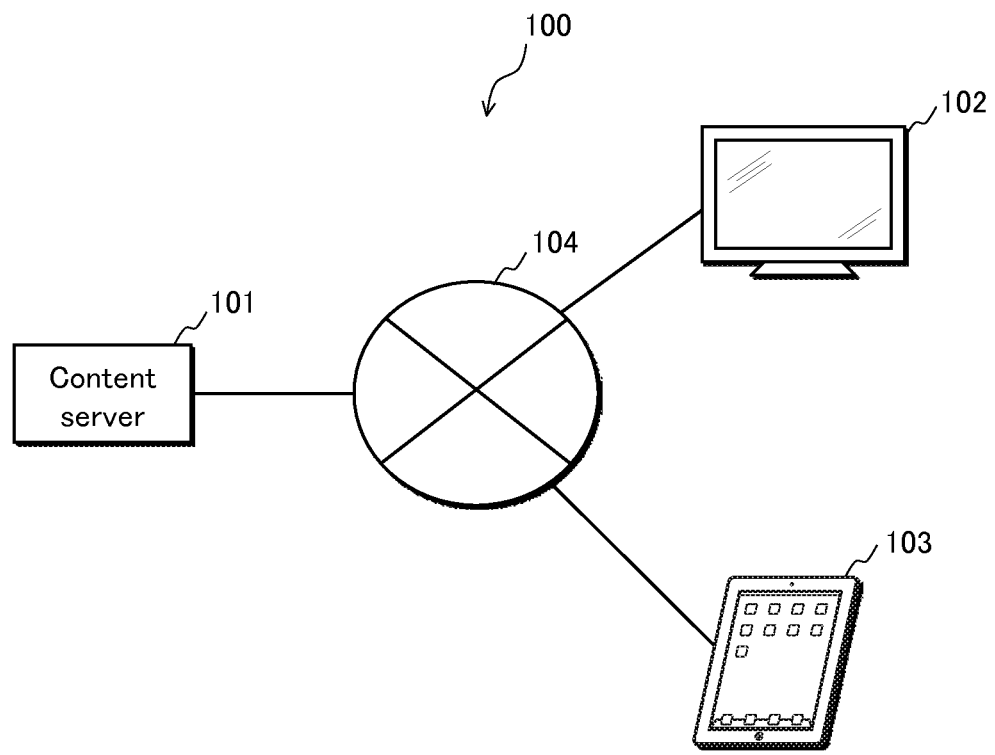
FIG. 1 illustrates the configuration of a content delivery system pertaining to an embodiment of the present disclosure.

FIG. 1 illustrates the configuration of a content delivery system 100 pertaining to an embodiment of the present disclosure.

As shown in FIG. 1, the content delivery system 100 includes a content server 101 that delivers content and playback control information or the like required for content playback, and content playback devices 102 and 103 that receive and play back content via a network 104.

Here, the content delivered by the content server 101 includes individual pieces of content for different viewing modes, created as a 2D version and a 3D version of a common product. The camera work and editing may differ between viewing modes. For example, a scene present in one viewing mode may be completely absent from another viewing mode. Also, pieces of content of different viewing modes may have corresponding scenes that differ in length.

Given pieces of content for different viewing modes, a user may play back the content in one viewing mode, interrupt the content during playback, and resume playback of the content upon changing to another viewing mode. A user resuming playback from the position (i.e., playback time) at which playback had been interrupted in the original viewing mode (i.e., playback time as measured from the start of the content), may view a repetition of video viewed prior to playback interruption, or conversely, may leave a portion of the content unviewed.

When the content delivery system pertaining to the present Embodiment is used to resume playback of content in different viewing modes, content playback is resumed from a video position equivalent to the video at the playback interrupt position, thus realising a smooth viewing experience for the user.

The following provides a detailed explanation of an Embodiment of the present disclosure.

(2. Configuration)

(2-1. Content)

First, the content pertaining to the present Embodiment is described.

The content is information made up of video, audio, and so on, provided with the goal of being viewed by the user. A single piece of content is made up of one file in a stream format.

The content delivered by the content server 101 includes two varieties of pieces, one being a plurality of pieces that differ in viewing mode, being created as a 2D version and a 3D version of a common product, and the other being a single piece of content created for a single viewing mode. Here, the viewing mode of content is the visual expression mode of that piece of content. Also, while the term viewing is typically limited to ordinary watching, in the present disclosure, this term is intended to encompass a wider scope that includes but is not limited to watching. Also, in the following explanation, individual pieces of content pertaining to different viewing modes of a common product are termed related content. For the aforementioned example of content in a 2D version and a 3D version, the 3D version serves as related content for the 2D version, and correspondingly, the 2D version serves as related content for the 3D version.

When the pieces of content for different viewing modes are created, the camera work and editing may differ according to the viewing mode. For example, a scene present in one viewing mode may be completely absent from the content in another viewing mode. Also, content in different viewing modes may have corresponding scenes that differ in terms of camera angles used for filming, scene length, and so on. In such cases, the pieces of content for different viewing modes may differ, even at chronologically identical positions from the start of the content. Here, a scene is a portion of a piece of content, delimited according to a fixed standard. Also, a chronological position from the start of a piece of content is simply referred to as a content position or the like.

Figure 7:
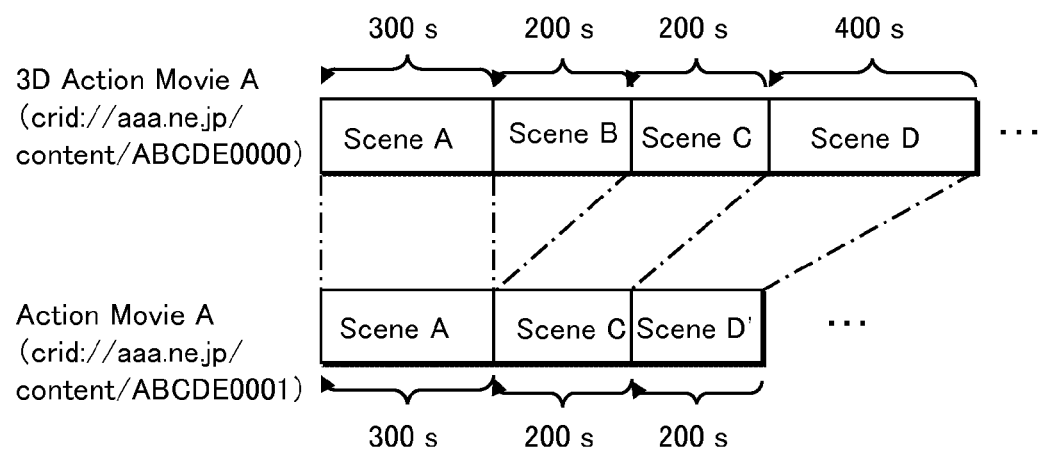
FIG. 7 schematically illustrates the configuration of two pieces of content for different viewing modes of a common product.

FIG. 7 schematically illustrates the configuration of two pieces of content for different viewing modes of a common product.

One of the two pieces of content is entitled 3D Action Movie A and is the piece of content for the 3D viewing mode. For convenience, this piece of content is hereinafter referred to as 3D content A.

The other piece of content is entitled Action Movie A and is the piece of content for the 2D viewing mode. For convenience, this piece of content is hereinafter referred to as 2D content A.

Each of the pieces of content is uniquely identified by a content reference ID (hereinafter, CRID), which is identifying information. The CRID of 3D content A is crid://aaa.ne.jp/content/ABCDE0000. Likewise, the CRID of 2D content A is crid://aaa.ne.jp/content/ABCDE0001. Here, 3D content A serves as related content for 2D content A, and correspondingly, 2D content A serves as related content for 3D content A.

As shown in FIG. 7, 3D content A is divided into four scenes, namely scene A through scene D. Similarly, 2D content A is divided into three scenes, namely scene A, scene C, and scene D'.

In 3D content A, scene A is a 300-second portion, chronologically defined from the start of the piece of content to 300 s. Scene B is a 200-second portion, chronologically defined from 301 s to 500 s. Scene C is a 200-second portion, chronologically defined from 501 s to 700 s. Scene D is a 400-second portion, chronologically defined from 701 s to 1100 s.

In 2D content A, scene A is a 300-second portion, chronologically defined from the start of the piece of content to 300 s. Scene C is a 200-second portion, chronologically defined from 301 s to 500 s. Scene D' is a 400-second portion, chronologically defined from 501 s to 700 s.

Here, scene A in 3D content A is identical to scene A from 2D content A. Also, scene C in 3D content A is identical to scene C from 2D content A.

However, scene B is inserted between scene A and scene C in 3D content A, only. Scene D and scene D' are nearly identical in terms of video and similar expression. However, scene D is longer than scene D', due to the insertion of a plurality of camera angles captured therefor.

Given the above-described pieces of content, for example, suppose that 3D content A is viewed in the 3D viewing mode for the first 400 seconds and then interrupted, that the viewing mode is subsequently changed to 2D, and that playback resumes by playing back 2D content A beginning at a position 400 seconds from the start. In such a case, a portion corresponding to the leading 100 seconds of scene C in 2D content A is not played back.

Conversely, suppose that 2D content A is played back in the 2D viewing mode for the first 400 seconds and then interrupted, that the viewing mode is subsequently changed to 3D, and that playback resumes by playing back 3D content A beginning at a position 400 seconds from the start. In such a case, a portion corresponding to the leading 100 seconds of scene B in 3D content A is not played back, and another portion corresponding to the leading 100 seconds of scene C is played twice.

(2-2. Content Server 101)

(2-2-1. Configuration)

The content server 101 is a server device that delivers content and control information required for playing back the content.

Figure 2:
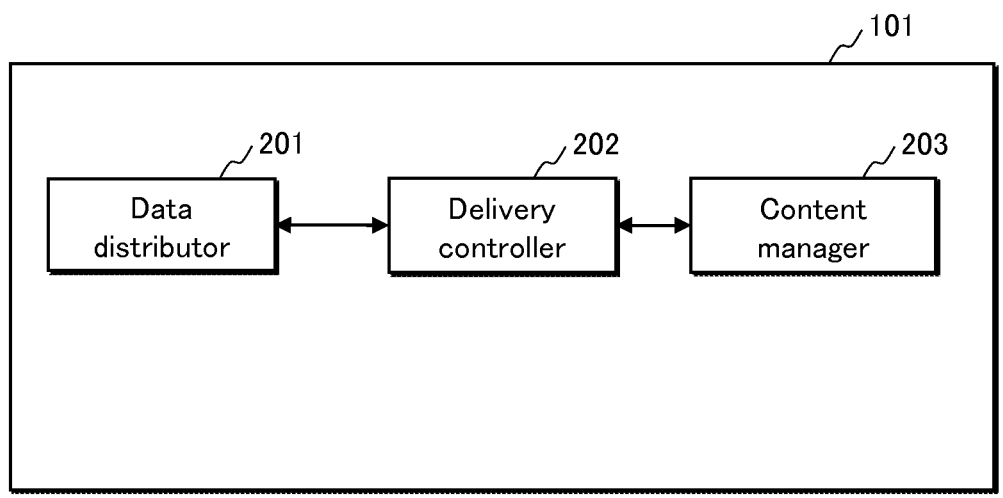
FIG. 2 is a block diagram illustrating the configuration of a content server.

FIG. 2 is a block diagram illustrating the configuration of the content server 101.

As shown, the content server 101 includes a data distributor 201, a delivery controller 202, and a content manager 203. The content server 101 also includes a processor and a memory. The functions of the delivery controller 202 are realised by the processor executing a program stored in the memory.

(Data Distributor 201)

The data distributor 201 is made up of a communication LSI, and is able to transmit and receive data via the network 104, (Delivery Controller 202)

The delivery controller 202 has the following functions (1) an Electronic Contents Guide (hereinafter, ECG) metadata delivery function, (2) a dictionary supply function, (3) a playback control metafile delivery function, and (4) a content delivery function. These functions are described below.

(1) ECG Metadata Delivery Function

The delivery controller 202 receives an ECG metadata delivery request and delivers ECG metadata as requested.

The ECG metadata is an XML document describing attribute information pertaining to the content, licenses, and so on. The ECG metadata includes, for instance, a program information (hereinafter, PI) table describing the attribute information of each piece of content, a program location (hereinafter, PL) table describing attribute information that indicates a storage location for each piece of content, a group information (hereinafter, GI) table describing a group to which each piece of content belongs, and a license information (hereinafter, LI) table describing license attributes for each piece of content.

The details of the ECG metadata are defined in the Association of Radio Industries and Businesses (hereinafter, ARIB) Coding, Transmission and Storage Specification for Broadcasting System Based on Home Servers ARIB STD-B38, version 2.0, published Apr. 26, 2010 (hereinafter simply referred to as ARIB STD-B38), and in IPTV Forum Japan CDN Scope Service Approach Specification IPTVFJ STD-0006 version 1.3, published Jul. 30, 2010 (hereinafter simply referred to as IPTVFJ STD-0006). The following explanation addresses only the portions relevant to the Embodiment.

The ECG metadata delivery function involves (1-1) a content list delivery function and (1-2) a PL delivery function. Each of these functions are described in turn, below.

(1-1) Content List Delivery Function

The content list delivery function involves delivering a PI used for displaying a list of content subject to delivery by the content delivery system 100.

The PI is metadata describing attribute information for the piece of content, such as the title, audiovisual codec, and so on. One PI corresponds to one piece of content. For convenience, a piece of content corresponding to a given PI is hereinafter referred to as corresponding content. The details of the PI are given later.

The delivery controller 202 realises the content list delivery function by receiving a PI delivery request that includes delivery parameters, and then delivering a PI that corresponds to the delivery parameters to the requesting device.

The delivery parameters include a user ID, a device ID, and an acquisition condition.

The user ID is identification information identifying a user of the requesting device.

The device ID is identification information identifying the requesting device.

The acquisition condition is a condition for choosing a PI for delivery, such as the first X titles in alphabetical order, or X titles in alphabetical order beginning with the Ath title.

For example, given an acquisition condition of the first X titles in alphabetical order, the delivery controller 202 delivers X PIs satisfying the acquisition condition to the requesting device. Specifically, the PIs are a PI for a piece of content listed alphabetically first among the titles, a PI for a piece of content listed alphabetically second among the titles, . . . , and a PI for a piece of content listed alphabetically Xth among the titles.

A content provider registers the content in the content manager 203, along with the metadata such as the PI, PL, GI, and LI. Here, when related content exists for a piece of registered content, the CRID of the related content given in the PI thereof and an acquisition source for information pertaining to the related content are also listed. A later-described related content list enables a determination of whether related content exists for a given piece of content to be made by determining whether or not such related content is listed.

When a given piece of content corresponding to a PI that is subject to delivery has already been delivered to a device having an identical user ID and viewing thereof has been interrupted, the delivery controller 202 also transmits, in association with the PI, playback interrupt position information indicating the chronological position at which the corresponding content has been interrupted and a device ID of the device on which viewing has been interrupted.

A later-described interrupt position information list enables determination of whether or not the given piece of content has already been delivered to a device having the same user ID and of whether viewing thereof has been interrupted to be made by determining whether or not the user ID, device ID, and interrupt position information in the delivery parameters are recorded.

The processing pertaining to content list delivery corresponds to steps S1502 and S1503, described later with reference to FIG. 15.

(1-2) PL Delivery Function

The PL delivery function involves delivery of a PL for each piece of content designated as subject to playback by the content playback devices 102 and 103. The delivery controller 202 receives a PL delivery request having a CRID as a parameter, and delivers the PL for the content identified by that CRID to the requesting device.

The processing pertaining to PL delivery corresponds to steps S1508 and S1509, described later with reference to FIG. 15.

(2) Dictionary Supply Function

When a search request is made for a term designated by a search parameter in the format Classification Scheme (dictionary) URI: Dictionary Number (term ID), the dictionary supply function involves acknowledging and replying to the search request by finding the meaning of the term in a later-described IPTVSERVICEHowRelatedCS dictionary (hereinafter, HR dictionary).

For example, the term ID of 22.1 is listed in the HR dictionary as "Relation: alternate viewing mode for the content (2D video)".

When a search request is received using http://www.iptv-forum.jp/cs/2011/07/IPTVSERVICEHowRelatedCS:22.1 as a search parameter, the delivery controller 202 replies by transmitting the definition of "Relation: alternate viewing mode for the content (2D video)" listed for the term ID of 22.1 in the HR dictionary.

(3) Playback Control Metafile Delivery Function

The delivery controller 202 receives a playback control metafile delivery request and delivers the request playback control metafile. The playback control metafile is defined by Digital TV Information Research Group, Networked Digital Television Specifications for Streaming, Codec chapter version 1.2, published Dec. 21, 2010. The content_chapter_info field of the entry resource information (hereinafter ERI), which is a type of playback control metafile, is usable for creating a playback position correspondence table.

(4) Content Delivery Function

The content delivery function involves performing content delivery, content delivery interruption, and trick play.

The content delivery is realised upon receiving a content delivery request having a CRID, viewing mode information, and playback start position information as parameters, by delivering a piece of content identified by the CRID in a viewing mode that is viewable according to the viewing mode information and beginning at a playback start position indicated in the playback start position information.

The content delivery interruption is realised upon receiving a playback interrupt request having, as parameters, a user ID, a CRID of a piece of content to be interrupted, a device ID, viewing mode information, and playback interrupt position information indicating a chronological position of playback interrupt position, by interrupting delivery of the content and storing the received parameters in a later-described interrupt position information table.

The trick play is realised upon receiving a trick play request for a trick play operation to be performed on the content being delivered, such as pause, fast-forward, or rewind, as a parameter, and delivering the content being played back to the content playback devices 102 and 103 such that trick play is performed according to the parameter.

(Content Manager 203)

The content manager 203 is made up of a non-volatile memory and stores various types of information pertaining to the content subject to delivery, such as the pieces of content, a related content table, the HR dictionary, playback control metafiles, ECG metadata, the playback position correspondence table, the interrupt position information table, and so on.

(2-2-2. Data Configuration)

The following describes the configuration of data stored in and used by the content server 101.

(Related Content Table)

The related content table is a correspondence table indicating whether or not related content exists for each piece of content subject to delivery by the content delivery system 100, and the association of the related content where available.

Specifically, for each piece of content subject to delivery by the content delivery system 100, the related content table lists the CRID, the viewing mode, and the CRID of the related content (hereinafter, related CRID), in a correspondence table.

FIG. 3 indicates an example of a related content table.

For example, the first row of the related content table shown in FIG. 3 indicates that the CRID of the piece of content is crid://aaa.ne.jp/content/ABCDE0000, and that the viewing mode is 3D. Also, the table indicates that the piece of content having the CRID of crid://aaa.ne.jp/content/ABCDE0000 has a piece of related content with a CRID of Grid://aaa.ne.jp/content/ABCDE0001.

(Program Information (PI))

The PI is metadata describing attribute information for the piece of content, such as the title, audiovisual codec, and so on. One PI corresponds to one piece of content.

FIG. 4 indicates an example of a PI, with the portion relevant to the present Embodiment being excerpted.

The ProgramInformation element has a programId attribute having an attribute value listing the CRID of the corresponding piece of content. The CRID is an ID for identifying the piece of content, and is a value assigned uniquely to each piece of content. In FIG. 4, the CRID is crid://aaa.ne.jp/content/ABCDE0000.

Also, the title element given for the type listed as main is an attribute value describing the title of the corresponding piece of content. For example, in FIG. 4, the title is 3D Action Movie A.

The RelatedMaterial element is provided when describing a site or a piece of content having some relation to the corresponding piece of content, and includes a HowRelated element and a MediaUri element.

The HowRelated element indicates a source of information indicating the nature of the relationship between the corresponding content and a piece of content or site specified in the MediaUri field. The href attribute of the HowRelated element has an attribute value in the format Classification Scheme (dictionary) URI: Dictionary number (termID).

For example, in FIG. 4, the attribute value of the href attribute is http://www.iptvforum.jp/cs/2011/07/IPTVSERVICEHowRelatedCS:22.1. Accessing the access source indicated by the attribute value enable acquisition of the item in the dictionary having a termID of 22.1.

The dictionary is described later. For instance, the item with the termID of 22.1 in the HR dictionary (i.e., http://www.iptvforum.jp/cs/2011/07/IPTVSERVICE HowRelatedCS) reads "Relation: alternate viewing mode for the content (2D video)".

The MediaUri element lists the related CRID. In FIG. 4, the related CRID is crid://aaa.ne.jp/content/ABCDE0001.

Referencing the RelatedMaterial element of the PI enables confirmation that the CRID of the corresponding content is crid://aaa.ne.jp/content/ABCDE0001 and that a piece of related content exists for another viewing mode (i.e., 2D video).

FIG. 5 indicates the PI for the related content pertaining to the corresponding content of the PI shown in FIG. 4.

The programId attribute of the ProgramInformation element has an attribute value reading crid://aaa.ne.jp/content/ABCDE0001.

The href attribute of the HowRelated element within the RelatedMaterial element lists an attribute value of http://www.iptvforum.jp/cs/2011/07/IP TVSERVICEHowRelatedCS:22.2.

The item in the HR dictionary (i.e., http://www.iptvforum.jp/cs/2011/07/IPTVSERVICEHowRelatedCS) with the termID of 22.2 reads, as described later, "Relation: alternate viewing mode for the content (Stereoscopic 3D)".

Also, the title element given for the type listed as main gives the title as Action Movie A.

The MediaUri element within the RelatedMaterial element lists the related CRID as crid://aaa.ne.jp/content/ABCDE0000.

Referencing the RelatedMaterial element of the PI enables confirmation that the CRID of the corresponding content is crid://aaa.ne.jp/content/ABCDE0000 and that a piece of related content exists for another viewing mode (i.e., Stereoscopic_3D).

(HR Dictionary)

The HR dictionary describes the meaning of the terms indicated in the above-described search parameters of the format Classification Scheme (dictionary) URI: Dictionary Number (termID).

FIG. 6 represents an excerpted portion of an HR dictionary 601 that is required for the present Embodiment. The HR dictionary is defined by IPTVFJ STD-0006. According to the standard, the relationship is defined for values 1 through 21 of the termID For example, an item with a termID of one indicates a trailer for a program associated with the CRID of the current piece of audiovisual content.

In the present Embodiment, the IPTVFJ STD-0006 standard is expanded to add values of 22.x (where x is any positive integer) to the termID values.

An element with the termID of 22.1 indicates an alternate viewing mode for the given piece of content (2D video). An element with the termID of 22.2 indicates an alternate viewing mode for the given piece of content (stereoscopic_3D).

The above-discussed attribute values of the href attribute for the HowRelated element within the RelatedMaterial element in each portion of the PI shown in FIGS. 4 and 5 are given in the format "Classification Scheme (dictionary) URI: Dictionary Number (term ID)".

When the attribute value of http://www.iptvforum.jp/cs/2011/07/IPTVSE RVICEHowRelatedCS:22.1 from the href attribute for the HowRelated element within the RelatedMaterial element in the portion of the PI shown in FIG. 4 is used as a search parameter, the HR dictionary is searched and returns a result indicating an alternate viewing mode for the piece of content (2D video).

(Playback Position Correspondence Table)

The playback position correspondence table indicates the correspondence relationship between a chronological position in a given piece of content and another chronological position in a piece of related content.

Figure 8:
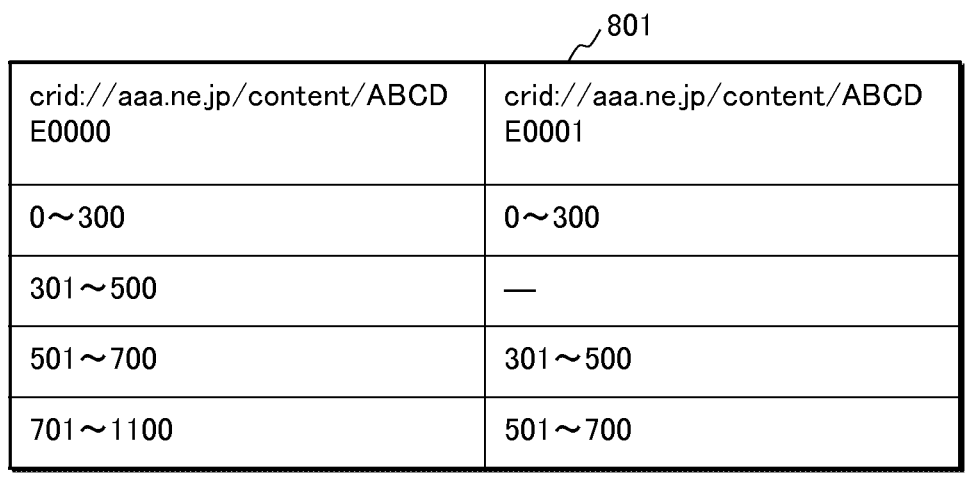
FIG. 8 indicates an example of a playback position correspondence table.

FIG. 8 indicates an example of a playback position correspondence table.

The playback position correspondence table 801 shown in FIG. 8 indicates the correspondence relationship between chronological positions in 3D content A, previously described with reference to FIG. 7, and chronological positions in the related content 2D content A.

As shown in FIG. 8, a chronological portion of 3D content A (which has a CRID of crid://aaa.ne.jp/content/ABCDE0000) defined from 0 s to 300 s (i.e., scene A) corresponds to a chronological portion of 2D content A (which has a CRID of crid://aaa.ne.jp/content/ABCDE0001) defined from 0 s to 300 s (i.e., scene A). This is as previously explained with reference to FIG. 7.

FIG. 8 also indicates that the chronological portion of 3D content A defined from 301 s to 500 s (i.e., scene B) has no corresponding portion in 2D content A. For convenience, the term non-scene is hereinafter used to refer to the absent corresponding scene in cases such as this, in which the playback position correspondence table does not list a corresponding scene for a given scene (e.g., scene B). For example, scene B of 3D content A has a correspondence relationship with a non-scene of 2D content A.

Here, any position of the 3D content A from 301 s to 500 s (e.g., at 310 s) is in correspondence with the leading position (at 301 s) of the scene following the non-scene in 2D content A, which is the chronological portion of 2D content A defined from 301 s to 500 s (i.e., scene C).

Also, a chronological portion of 3D content A defined from 501 s to 700 s (i.e., scene C) corresponds to a chronological portion of 2D content A defined from 301 s to 500 s (i.e., scene C). For example, a chronological position at 521 s, which is 20 seconds from the start of scene C in 3D content A is in correspondence with a chronological position at 321 s, which is 20 seconds from the start of scene C in 2D content A.

Similarly, a chronological portion of 3D content A defined from 701 s to 1100 s (i.e., scene D) corresponds to a chronological portion of 2D content A defined from 501 s to 700 s (i.e., scene D'). Here, scene D is 400 seconds in length, while scene D' is only 200 seconds in length. The scenes thus differ.

In such a case, for example, the correspondence relationship is established according to a reciprocal value of the ratio between the length of the scene in 3D content A (i.e., scene D) and the length of the corresponding scene in 2D content A (i.e., scene D').

Specifically, scene D and scene D' have a length ratio of 2, such that the reciprocal value is ½.

Accordingly, a chronological position at 721 s, which is 20 seconds from the start of scene D in 3D content A is in correspondence with a chronological position at 511 s, which is 20×(½) seconds from the start of scene D' in 2D content A.

A position associated with a position in a piece of content, or a position obtained by converting a position in a piece of content, in another piece of content, is termed a corresponding position. As described above, a scene such as scene B in 3D content A may, as previously discussed, have no corresponding scene in 2D content A directly described by the playback position correspondence table. However, in such a case, all positions within scene B of 3D content A are associated with the leading position of scene C in 2D content A. Thus, the leading position of scene C serves as the corresponding position thereof.

(ERI for Playback Position Correspondence Table Creation by Playback Device)

The content of playback position correspondence table stored in the content server 101 is written into the ERI, and thus transmitted to the content playback devices 102 and 103.

FIG. 9 illustrates a portion of a transmitted ERI pertaining to the 3D content A, taken from the playback position correspondence table of FIG. 8. FIG. 9 and the later-discussed FIG. 10 each indicate a playback position correspondence table from one of two ERIs.

The content_title element of the ERI shown in FIG. 9 lists the title of the piece of content. In FIG. 9, the title listed is that of 3D content A, namely 3D Action Movie A.

The chapter elements within the content_chapter_info element each correspond to one scene.

The number attribute of each chapter element indicates a serial number for that scene (or chapter).

The chapter_point attribute of each chapter element indicates the chronological start position of that scene within the piece of content.

The chapter_title element within each chapter element indicates the title of the scene.

For example, in FIG. 9, the chapter element having a number attribute of two indicates that, for scene B, the chronological start position within the piece content is at 301 s. Note that the chronological end point of scene B is directly before (i.e., at 500 s) the start position (i.e., 501 s) of the next scene (i.e., scene C).

FIG. 10 illustrates a portion of a transmitted ERI pertaining to the 2D content A, taken from the playback position correspondence table of FIG. 8. The FIG. 10 is described similarly to FIG. 9.

In the ERI for 2D content A, the value of the chapter_point element within the chapter element for the number attribute value of two is equivalent to the chapter_point element within the chapter element for the number attribute value of three. This is because the scene length (or duration) of the scene having the number attribute value of two is zero seconds. That is, the scene having the number attribute value of two (i.e., scene B in 3D content A) is not present in 2D content A.

(Interrupt Position Information Table)

When a given piece of content has already been transmitted and viewing thereof is interrupted, the interrupt position information table indicates the playback interrupt position and the like.

FIG. 11 indicates an example interrupt position information table.

The interrupt position information is made up of a user ID, a CRID, a device ID, viewing mode information, and playback interrupt position information.

The user ID is information identifying the user who desires content delivery. The user ID is uniquely assigned to each user by a content delivery provider, upon forming a content delivery agreement or the like. For example, the user ID may be a subscriber number. In cases where a single user uses a plurality of devices, a plurality of playback interrupt position information pieces are provided for that user in the interrupt position information table.

The CRID is identifying information identifying a piece of content.

The device ID is information uniquely identifying a content playback device used by the user. The device ID is uniquely allocated to each device by the content delivery provider in response to a user order made upon forming the content delivery agreement.

The viewing mode information indicates the viewing mode in which the piece of content was being viewed prior to interruption. In the present Embodiment, the viewing mode information indicates one of 2D and stereoscopic_3D. However, no information is indicated when the viewing of the content has not been interrupted.

The playback interrupt position information indicates a playback interrupt position, chronologically measured in seconds from the start of the piece of content, at which viewing was interrupted. When viewing of the content has not been interrupted, no playback interrupt position information is indicated.

(2-3. Content Playback Device 102)
(2-3-1. Configuration)

Content playback device 102 receives a stream of content and performs playback.

Figure 12:
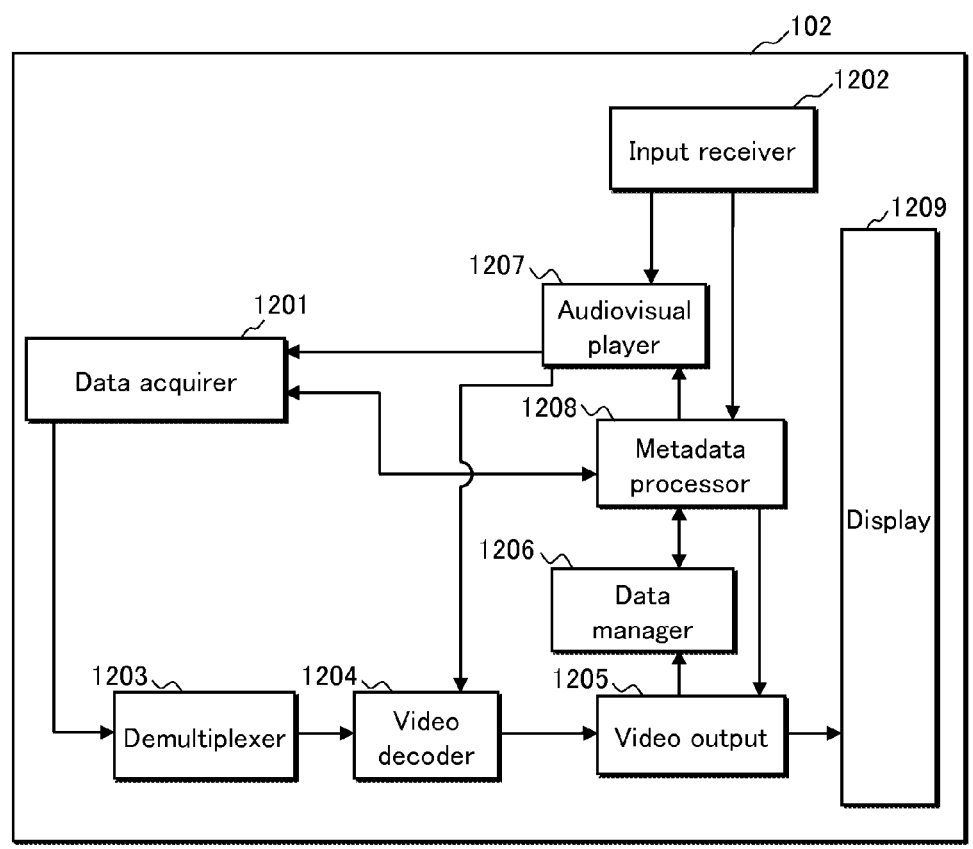
FIG. 12 is a block diagram illustrating the configuration of content playback device 102.

FIG. 12 is a block diagram illustrating the configuration of content playback device 102.

As shown, content playback device 102 includes a data acquirer 1201, an input receiver 1202, a demultiplexer 1203, a video decoder 1204, a video output 1205, a data manager 1206, an audiovisual player 1207, a metadata processor 1208, and a display 1209. Content playback device 102 includes a processor and a memory. The functions of the audiovisual player 1207 and the metadata processor 1208 are realised by having the processor execute a program stored in the memory.

(Data Acquirer 1201)

The data acquirer 1201 is made up of a communication LSI, and is able to transmit and receive data via the network 104, The data acquirer 1201 outputs received content to the demultiplexer 1203, and outputs acquired metadata, such as ECG metadata and playback control metadata, to the metadata processor 1208.

(Input Receiver 1202)

The input receiver 1202 includes a keypad, a remote control, or similar, and notifies the audiovisual player 1207 and the metadata processor 1208 in response to an instruction made by the user (hereinafter, a user instruction) operating the keypad, remote control, or similar.

For example, upon receiving user instructions for a content list display request, content selection, playback, or similar, the input receiver 1202 notifies the metadata processor 1208. Alternatively, upon receiving user instructions for trick play, such as pausing, fast-forwarding, or rewinding during content playback, or upon receiving a playback stop instruction, the input receiver 1202 notifies the audiovisual player 1207.

(Demultiplexer 1203)

The demultiplexer 1203 is made up of a demultiplexer LSI, receives a multiplexed MPEG-2 transport stream, and performs demultiplexing into audio, video, program specific information (hereinafter, PSI) and service information (hereinafter, SI), and other packets. The demultiplexer 1203 outputs demultiplexed audio packets to a (non-diagrammed) audio decoder, and outputs demultiplexed video packets to the video decoder 1204. The demultiplexer 1203 analyses the PSI and SI information from a program association table (hereinafter, PAT), a program map table (hereinafter, PMT), and so on. The process of handing over the packets to an appropriate decoder is widely known, and explanations thereof are thus omitted.

(Video Decoder 1204)

The video decoder 1204 is realised by an audiovisual signal processing LSI, receives a notification from the audiovisual player 1207 regarding the viewing mode used for playing back the piece of content, obtains frame images enabling video to be displayed in the viewing mode of the notification by decoding the video packets, and outputs the result to the video output 1205.

(Video Output 1205)

The video output 1205 is realised by the aforementioned audiovisual signal processing LSI, and outputs images to the display 1209 at regular intervals. Specifically, the images are frame images obtained from the video decoder 1204, graphical user interface (hereinafter, GUI) images received from the metadata processor 1208, and the like.

(Data Manager 1206)

The data manager 1206 is made up of a non-volatile memory, and stores a user ID identifying the user of the device, a device ID identifying the device, received content, ECG metadata, playback control metadata, and information pertaining to viewing conditions for the content.

(Audiovisual Player 1207)

The audiovisual player 1207 performs playback control of the content.

The playback control of the content performed by the audiovisual player 1207 involves receiving a content playback request from the metadata processor 1208, having a source URI, CRID, viewing mode information, and playback start position information of the playback target content as parameters, and transmitting a content delivery request to the source URI (i.e., the content server 101 of the present Embodiment) of the playback target content with parameter information that includes the received parameters. The audiovisual player 1207 then receives the content in response to the content delivery request and performs playback.

When a trick play request for pause, fast-forward, rewind or the like is received from the input receiver 1202 during content playback, the audiovisual player 1207 transmits a trick play request to the content server 101, having the trick play type as a parameter. The audiovisual player 1207 then receives the content in response to the trick play request and performs playback.

Further, when an instruction to interrupt viewing is made using the input receiver 1202 when the user has not yet completed a viewing of the content, the audiovisual player 1207 transmits a content delivery interrupt request to the content server, having playback interrupt position information that indicates the playback interrupt position of the content as a parameter, and stores the playback interrupt position as viewing condition information in the data manager 1206.

(Metadata Processor 1208)

The metadata processor 1208 processes acquired metadata, and has the following functions: (1) content list display function, (2) content detail information display function, (3) metafile processing, and (4) position conversion function.

(1) Content List Display Function

The content list display function involves displaying, as the GUI, a content list image in which all pieces of content subject to delivery are listed.

The title of each piece of content is described by the attribute value of the title element in the PI of the ECG metadata.

Figure 15:
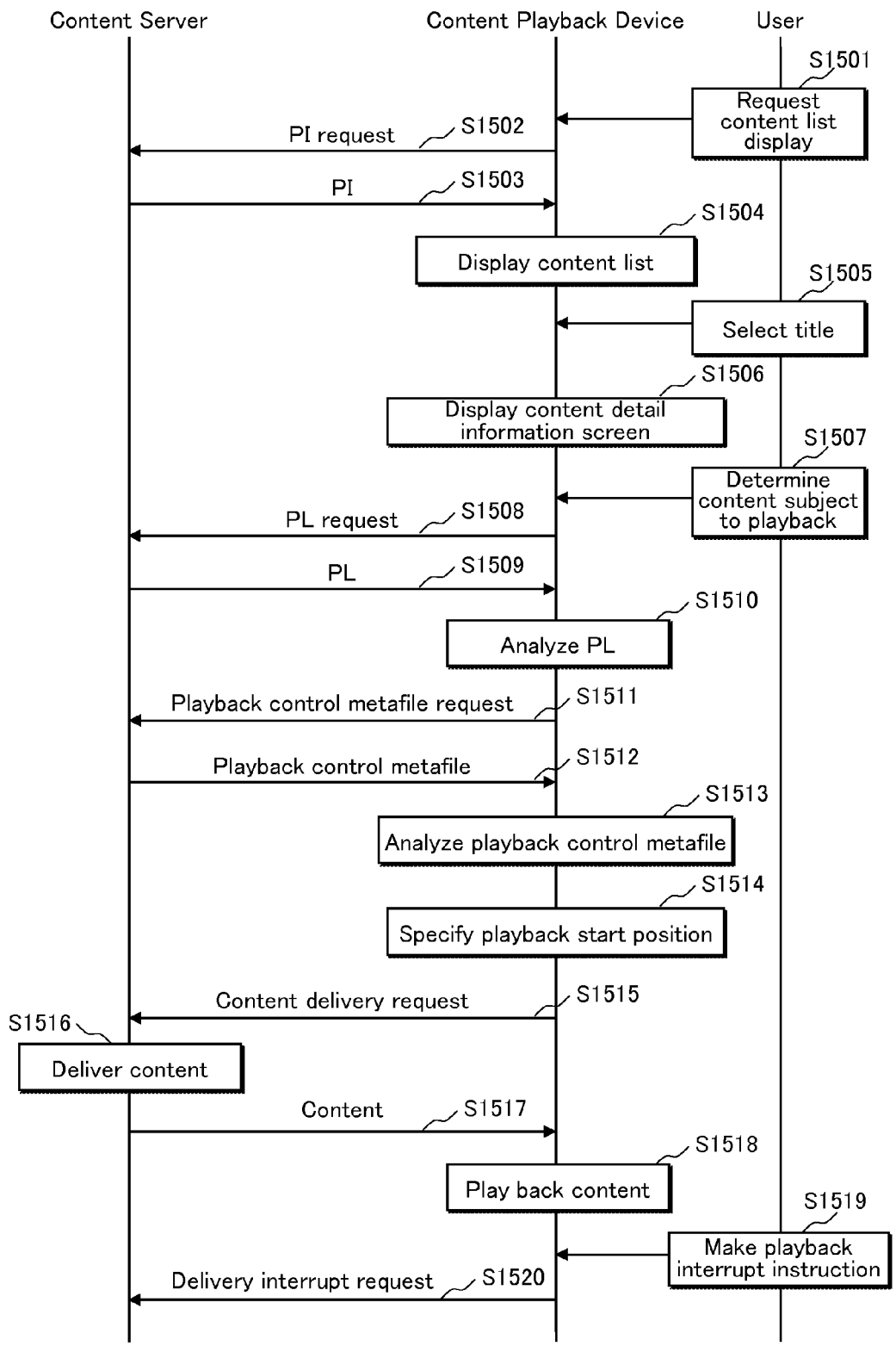
FIG. 15 is a flowchart indicating the overall operations of the content delivery system when playing back content.
Figure 16:
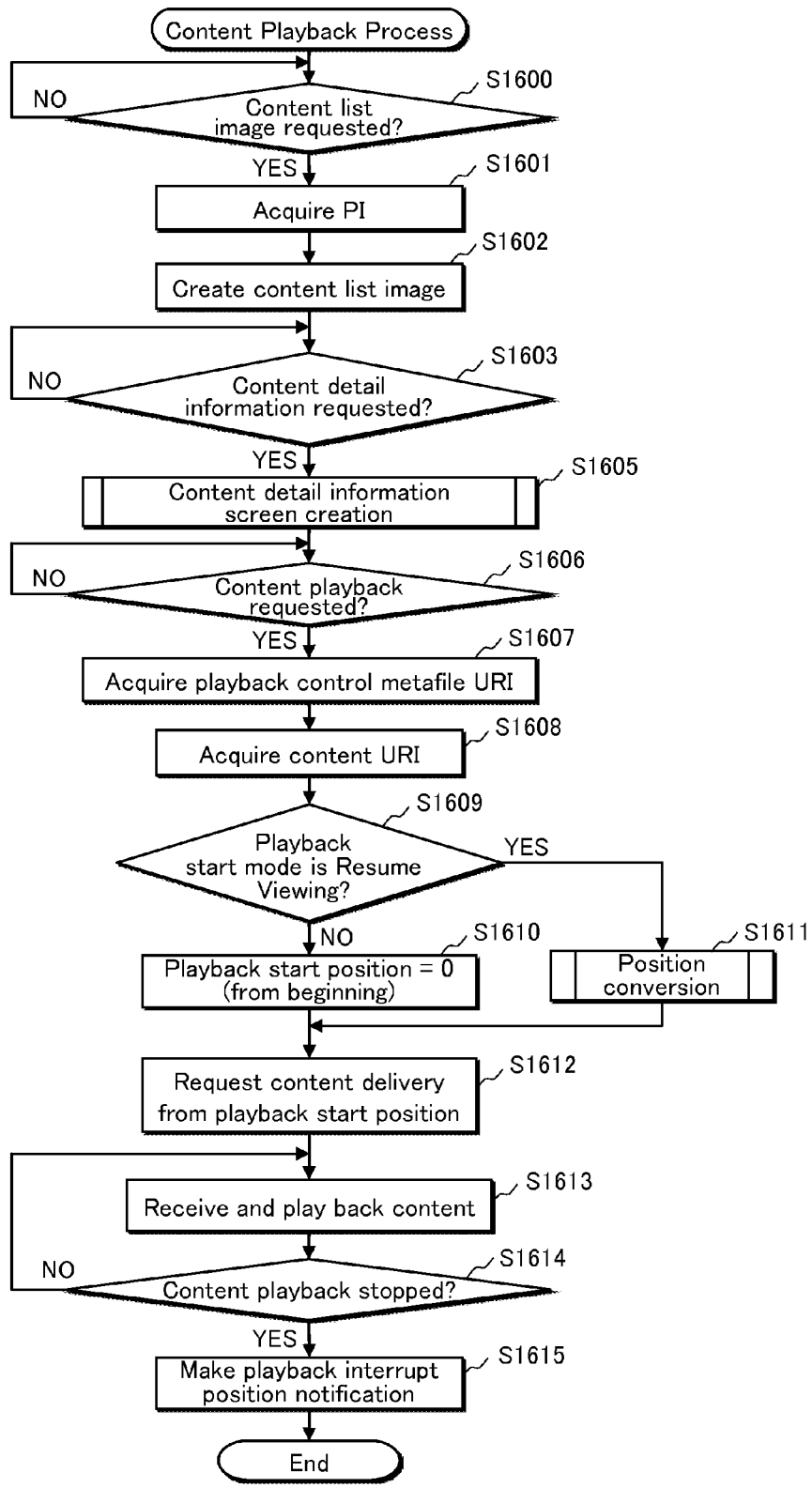
FIG. 16 is a flowchart of the operations occurring when a user selects a piece of content and begins playback, performed by the content playback device until the playback stops.

The metadata processor 1208 realises the content list display function by transmitting a PI delivery request that includes delivery parameters to the content server 101 (see step S1502 in FIG. 15 and step S1601 in FIG. 16). The delivery parameters at least include an acquisition condition.

The acquisition condition indicates, for example, that X titles, beginning with the Ath title, are to be displayed in alphabetical order. Here, X is a number of titles listed in one content list image, for example. The acquisition condition and the transmission protocol thereof are defined in IPTVFJ STD-0006.

The delivery parameters may also include a user ID and a device ID. When the user ID and the device ID are included in the delivery parameters, the piece of content corresponding to the PI subject to delivery has already been delivered to a device having the same user ID, and viewing thereof is determined to have been interrupted, the content server 101 transmits interrupt position information indicating the chronological position at which playback of the piece of content was interrupted and the device ID of the device on which playback was interrupted, in associate with the previously-described PI. In such a case, the metadata processor 1208 receives the transmitted information and stores the CRID of the piece of content, the interrupt position information, the device ID, and the CRID of related content as indicated by the PI in the data manager 1206 as viewing condition information.

The metadata processor 1208 also extracts titles from the acquired PI and generates a content list image therefrom, then transmits the generated image to the video output 1205 (see step S1602 of FIG. 16).

Figure 14A:
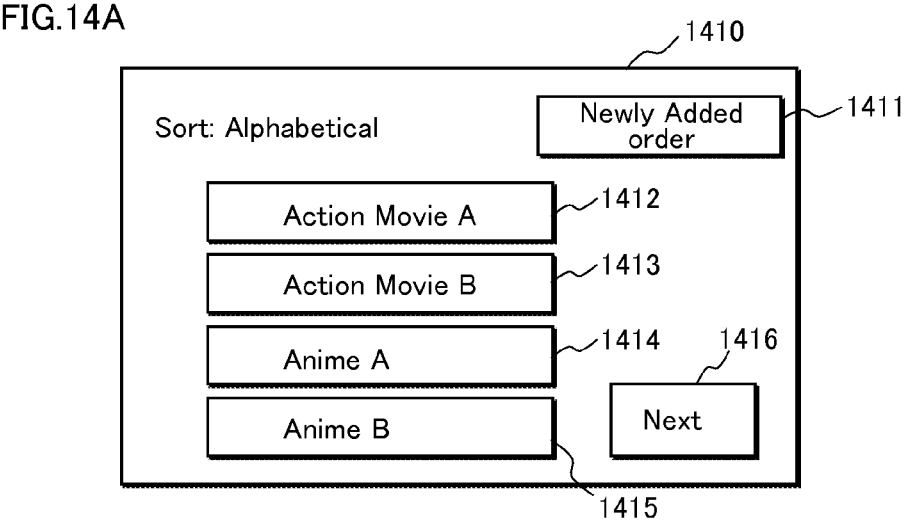
FIG. 14A indicates an example of a content list image, FIG. 14B indicates an example of a content detail information image when viewing has not been interrupted, and FIG. 14C indicates an example of a content detail information image when viewing has been interrupted.

FIG. 14A indicates an example of a content list image.

A content list image 1410 is arranged with buttons 1412 through 1415 each indicating a title.

Button 1412 indicates a title of Action Movie A, button 1413 indicates a title of Action Movie B, button 1414 indicates a title of Anime C, and button 1415 indicates a title of Anime D.

The content list image 1410 also displays, for example, navigation button 1411 for modifying the display order of the titles, and navigation button 1416 for making an instruction to display another content list image showing a different list of titles.

While the content list image 1410 is being displayed, the user may, for example, choose a piece of content by operating the input receiver 1202 and selecting (i.e., pressing) one of the buttons 1412 to 1415 displaying a title to choose that piece of content. The piece of content chosen through the user operation from the displayed content list image is hereinafter termed the chosen content.

The above-described content subject to playback is not necessarily the same as the chosen content. For example, when the chosen content is 3D content A, the content subject to playback may be related content thereof, namely 2D content A which has a different viewing mode than 3D content A.

(2) Content Detail Information Display

The content detail information display function involves displaying a content detail information image that lists detailed information about the chosen content. This function corresponds to step S1506 in FIG. 15, to FIG. 17, and so on.

Figure 14B:
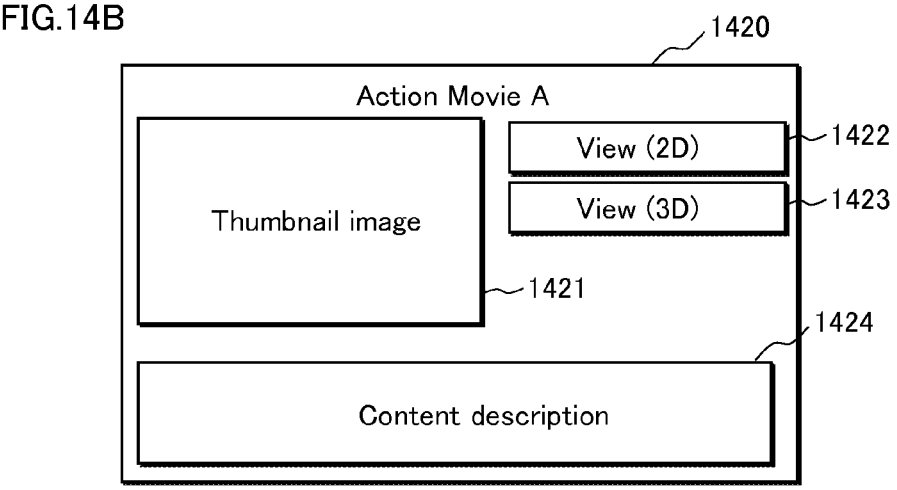

FIG. 14B illustrates an example of a content detail information image for a situation where neither of the chosen content and the related content have been interrupted during viewing.

As shown, content detail information image 1420 is about the chosen content having the title Action Movie A. The content detail information image 1420 has arranged therein a thumbnail image 1421, navigation button 1422 for selecting a 2D viewing mode, navigation button 1423 for selecting a 3D viewing mode, and a content description image 1424 describing details the chosen content in text.

Also, given that neither of the chosen content and the related content have been interrupted during playback (corresponding to NO in step S1706 in FIG. 17), the content detail information image 1420 does not have a navigation button for resuming viewing arranged therein.

Figure 14C:
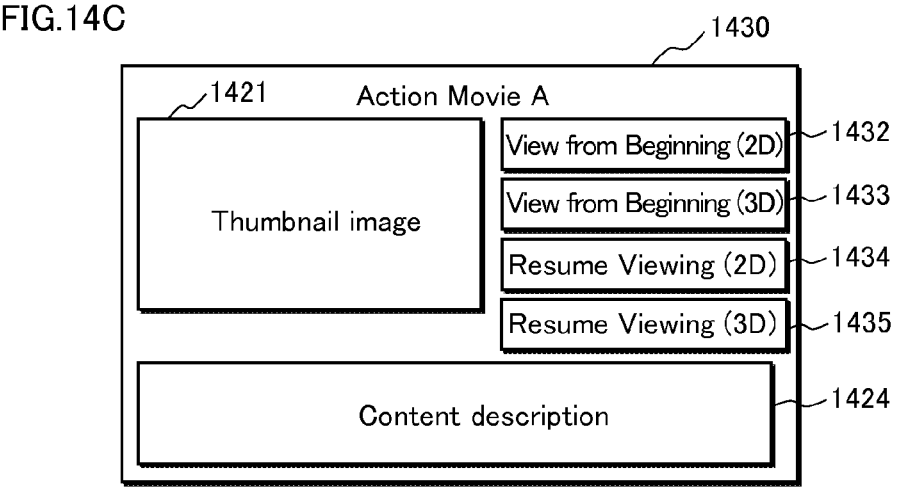

FIG. 14C illustrates an example of a content detail information image for a situation where one of the chosen content and the related content have been interrupted during viewing.

Figure 17:
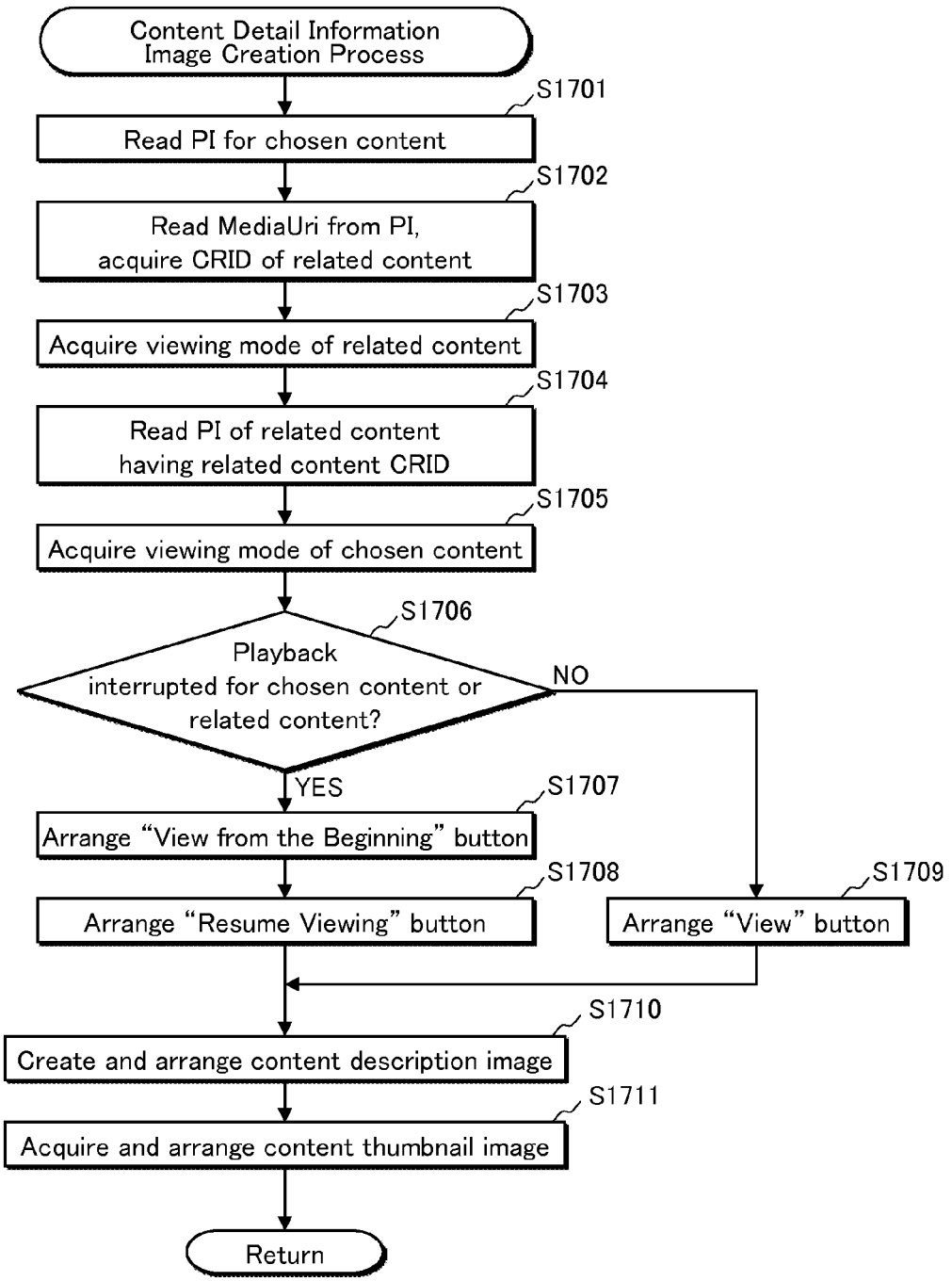
FIG. 17 is a flowchart indicating a content detail information image creation process.

As shown in FIG. 14C, the content detail information image 1430 is for a case where one of the chosen content and the related content has been interrupted during viewing (corresponding to YES in step S1706 of FIG. 17). Thus, the navigation buttons 1422 and 1423 of FIG. 14B are replaced by navigation button 1432 for making a selection of restarting viewing from the beginning in the 2D viewing mode, navigation button 1433 for making a selection of restarting viewing from the beginning in the 3D viewing mode, navigation button 1434 for making a selection of resuming viewing in the 2D viewing mode, and navigation button 1435 for making a selection of resuming viewing in the 3D viewing mode.

(3) Metafile Processing

The metafile processing function involves acquiring the PL for the piece of content subject to playback (see step S1607 of FIG. 16), acquiring the playback control metafile, and acquiring the source URI of the piece of content subject to playback (see step S1608 of FIG. 16).

Also, when viewing is resumed using a different viewing mode than the previously-used viewing mode, the metafile processing function involves acquiring the ERI corresponding to the piece of content in the previously-used viewing mode from the content server 101, generating a playback position correspondence table from the ERI corresponding to the piece of content in the previously-used viewing mode and the already-received ERI of the content subject to playback, and recording the result in the data manager 1206.

The processing of the playback control metafile is defined in IPTV Forum Japan VOD Specifications IPTVFJ STD-0002 version 1.1, published Apr. 16, 2012 (hereinafter simply referred to as IPTVFJ STD-0002) and in IPTVFJ STD-0006.

(4) Position Conversion

When playback of related content for the piece of content subject to playback has been interrupted, the position conversion function is used to convert the playback interrupt position of the related content into a playback start position for the piece of content subject to playback. This function proceeds as indicated by the later-described FIG. 18.

(Display 1209)

The display 1209 is made up of a display device and a driver LSI therefor, and displays images received from the video output 1205 on the display device.

(2-3-2. Data Configuration)

FIG. 13A indicates an example of viewing condition information.

The viewing condition information is generated when a piece of content is interrupted during viewing, and stored in memory.

The viewing condition information is made up of the CRID identifying the piece of content, the viewing mode, the playback interrupt position information, and the CRID of the related content.

When the metadata processor 1208 has received the playback interrupt position information and a device ID with the PI from the content server 101, the viewing condition information is stored by the metadata processor 1208 in the data manager 1206 with the playback interrupt position information, the device ID, the CRID of the piece of content described by the PI, and the CRID of the related content as parameters.

FIG. 13B indicates an example of viewing condition information that differs from the example of FIG. 13A.

The viewing condition information is referenced and updated as needed by the metadata processor 1208.

(2-4. Content Playback Device 103)

Content playback device 103 is configured similarly to content playback device 102. However, the device ID of content playback device 102 is D01 and the device ID of content playback device 103 is D02.

(3. Operations)

(3-1. Overall Operations)

The following explanation of the overall operations, up to and including content playback, of the content delivery system 100 configured as described above, is centred on transmission and reception of data. The operations of the content playback devices 102 and 103 are described in detail later, with reference to FIGS. 16 through 18.

FIG. 15 is a flowchart illustrating the overall operations of the content delivery system 100 when playing back content.

First, the user of content playback device 102 uses the input receiver 1202 to input a content list display request, which is subject to delivery (S1501). The input receiver 1202 acquires the content list display request, and makes a notification to the metadata processor 1208 of the acquired content list display request.

The metadata processor 1208 makes an acquisition request to the content server 101 for a plurality of PIs needed to display the content list (S1502). The content server 101 transmits the acquired request to content playback device 102 (S1503).

The metadata processor 1208 extracts the titles from the plurality of PIs so acquired, generates a content list image, and transfers the content list image to the display 1209 via the video output 1205 (S1504).

The user viewing the content list image chooses one title among the titles listed in the content list image and uses the input receiver 1202 to input the choice (S1505).

The metadata processor 1208 generates a content detail information display image for the piece of content having the selected name (i.e., the chosen content) for display (S1506).

The user viewing the content detail information display image selects a piece of content subject to playback, a viewing mode, and a playback start position, and uses the input receiver 1202 to input the selections (S1507). The user is easily able to select the piece of content subject to playback, the viewing mode, and the playback start position by pressing a navigation button or the like displayed as a GUI element in the content detail information display image.

The metadata processor 1208 extracts the title chosen by the user. In other words, the metadata processor 1208 extracts the CRID written as the title element for the title of the chosen content from the PI. The metadata processor 1208 then makes a request to the content server 101 for the PL of the ECG metadata, taking the extracted CRID as a parameter (S1508).

The content server 101 transmits the PL pertaining to the CRID indicated as the parameter to content playback device 102 (S1509).

The metadata processor 1208 acquires the PL from the content server 101. The metadata processor 1208 then analyses the PL, and acquires the URI of the playback control metafile described in the ProgramURL element within the OnDemandProgram element of the PL (S1510).

The metadata processor 1208 makes a request to the resource designated by the acquired URI (the content server 101 in the present Embodiment) for delivery of the playback control metafile (S1511). The content server 101 transmits the requested playback control metafile to content playback device 102 (S1512).

The metadata processor 1208 acquires the playback control metafile, performs analysis thereon, and acquires the URI written into the ERI of the playback control metafile to serve as the URI for acquiring the piece of content subject to playback (S1513). The metadata processor 1208 then specifies the playback start position for the piece of content subject to playback (S1514).

The metadata processor 1208 outputs a playback request to the audiovisual player 1207, having, as parameters, the source URI of the piece of content subject to playback, viewing mode information that indicates the viewing mode, and the playback start position.

The audiovisual player 1207 transmits, to the content server 101 indicated by the source URI for the piece of content subject to playback, a content delivery request having the acquired CRID, the viewing mode information, and the playback start position as parameters (S1515).

The content server 101 performs content delivery to content playback device 102 in conformity with the acquired parameters (S1516, S1517).

The audiovisual player 1207 receives and plays back the delivered content (S1518).

Once the user of content playback device 102 inputs a playback interrupt instruction for the piece of content using the input receiver 1202 (S1519), the audiovisual player 1207 transmits a delivery interrupt request for the piece of content to the content server 101 (S1520).

(3-2. Playback Process by Content Playback Device)

FIG. 16 is a flowchart of the operations occurring in the content delivery system 100 when the user selects a piece of content and begins playback, performed by content playback device 102 until the playback stops.

First, the input receiver 1202 waits for a content list display request to be input by the user (NO in S1600). When input is received (YES in S1600), a notification is made to the metadata processor 1208.

The metadata processor 1208 transmits a PI delivery request that includes delivery parameters to the content server 101 (S1601). The delivery parameters include a user ID, a device ID, and an acquisition condition. The acquisition condition indicates, for example, that X titles beginning with the Ath title are to be displayed in alphabetical order. In this example, the metadata processor 1208 acquires the PI pertaining to the X pieces of content beginning with the Ath in alphabetical order, from the content server 101.

For every acquired PI, the metadata processor 1208 updates the value of A in increments of X and continues to acquire PIs. The acquisition of PIs continues until an amount sufficient to generate a list display image is obtained. Also, PIs are acquired as necessary when the list display image requires an update.

Next, the metadata processor 1208 extracts the title written as the attribute value of the title element in each of the acquired PIs. A content list image (e.g., FIG. 14A as previously described) is then generated by listing the titles. The content list image is transmitted to the video output 1205 and displayed on the display 1209 (S1602).

The input receiver 1202 waits for a user instruction, in which the user viewing the content list image chooses one title among the titles listed in the content list image (NO in S1603).

When one of the titles has been selected, that is, when the chosen content has been specified (YES in S1603), a content detail information image creation process is performed (S1605). The details of S1605 are indicated in FIG. 17.

Subsequently, the display 1209 displays the content detail information image created in the content detail information image as a GUI element, and waits for the user to input a content playback request using the input receiver 1202 (NO in S1606). The content playback request is input by pressing down (or equivalent) on a button displayed in the content detail information image as "View", "View from the Beginning", or "Resume Viewing". The pressing of the button determines the piece of content subject to playback that is to be viewed (i.e., one of the chosen content and the related content), the viewing mode therefore (hereinafter, the playback viewing mode), and the playback start mode (e.g., viewing from the beginning or resuming viewing).

For example, the viewing mode of the chosen content may be 3D while the viewing mode of the related content is 2D. In such a case, when the user presses the button displayed as "View from the Beginning (3D)", a determination is made that the chosen content having a 3D viewing mode is the piece of content subject to playback, that the playback viewing mode is 3D, and that the playback start mode is viewing from the beginning. Alternatively, when the user presses the button displayed as "Resume Viewing (2D)", a determination is made that the related content is the piece of content subject to playback, that the playback viewing mode is 2D, and that the playback start mode is resuming viewing.

Next, when a content playback request has been input (YES in S1606), the metadata processor 1208 extracts the CRID from the PI of the piece of content subject to playback. The metadata processor 1208 then transmits a PL delivery request having the extracted CRID as a parameter to the content server 101, and acquires the PL from the content server 101 in response. The metadata processor 1208 then acquires the URI of the playback control metafile described in the ProgramURL element within the OnDemandProgram element of the PL (S1607).

Next, the metadata processor 1208 makes the playback control metafile delivery request to the source of the playback control metafile, acquires the playback control metafile in response, and extracts the source URI for the piece of content subject to playback from the playback control metafile (S1608).

Then, when the playback start mode is not resuming viewing (NO in S1609), the metadata processor 1208 sets the playback start position to zero (i.e., the beginning) (S1610) and advances to S1612.

When the playback start mode is resuming viewing (YES in S1609), a position conversion process is performed (S1611), and the process advances to S1612. The details of the position conversion process are described later, with reference to FIG. 18.

In S1612, the metadata processor 1208 outputs a playback request to the audiovisual player 1207, having, as parameters, the source URI of the piece of content subject to playback, the CRID of the piece of content subject to playback, viewing mode information that indicates the viewing mode, and the playback start position.

The audiovisual player 1207 transmits, to a resource (i.e., the content server 101 in the present Embodiment) indicated by the source URI for the piece of content subject to playback, a content delivery request having the acquired CRID, the viewing mode information, and the playback start position as parameters.

In response to the content delivery request, the audiovisual player 1207 receives the piece of content delivered by the content server 101 and performs playback thereof (S1613).

Monitoring is performed while the piece of content is being played back, so as to determine whether or not the user has made a playback interrupt request using the input receiver 1202 (S1614). Playback continues as long as no such instruction is made (NO in S1614).

When an instruction is made (YES in S1614), a delivery interrupt request is transmitted to the content server 101, having as parameters the user ID stored in the data manager 1206, the CRID of the piece of content being interrupted, the device ID of the device stored in the data manager 1206, viewing mode information indicating the viewing mode, and playback interrupt position information indicating the playback interrupt position (S1615). The processing then ends (End).

The content playback processing also ends when the piece of content has been viewed to completion.

(3-3. Content Detail Information Screen Creation)

The following detailed explanation of the content detail information image creation process corresponds to S1605 mentioned above.

FIG. 17 is a flowchart indicating the content detail information image creation process.

First, the metadata processor 1208 of content playback device 102 reads the PI of the chosen content from the data manager 1206 (S1701).

Next, the MediaUri in the RelatedMaterial element of the chosen content PI is read, and the CRID of the related content is obtained therefrom (S1702).

Then, the HR dictionary of the content server 101 is referenced using the URI written as the href attribute value of the HowRelated element of the chosen content PI, and the viewing mode of the related content is obtained therefrom (S1703).

Next, the PI having the CRID of the related content, i.e., the PI of the related content, is read from the data manager 1206 (S1704).

Then, the HR dictionary of the content server 101 is referenced using the URI written as the href attribute value of the HowRelated element of the related content PI, and the viewing mode of the chosen content is obtained therefrom (S1705).

Next, the metadata processor 1208 makes a determination regarding whether or not playback (i.e., viewing) has been interrupted for either of the chosen content and the related content (S1706).

This determination involves checking whether or not the data manager 1206 stores viewing condition information for the chosen content and viewing condition information for the related content. If viewing condition information is stored for either of these pieces of content, the determination is made that playback has been interrupted.

When the determination is negative (NO in S1706), a button labelled "View" is arranged in the content detail information image for the viewing mode of the chosen content and the viewing mode of the related content (S1709). The "View" button is provided only for pieces of content that can be viewed. Specifically, when no related content is available, then the "View" button is only provided for the chosen content. Further, when related content is available, a "View" button is provided for viewing the viewing mode of the chosen content and another "View" button is provided for viewing the viewing mode of the related content. The process then advances to S1710.

When the determination is affirmative (YES in S1706), a button labelled "View from the Beginning" is arranged in the content detail information image for the viewing mode of the chosen content and the viewing mode of the related content (S1707). The "View from the Beginning" button is provided only for pieces of content that can be viewed. Specifically, when no related content is available, then the "View from the Beginning" button is only provided for the chosen content. Further, when related content is available, a "View from the Beginning" button is provided for viewing the viewing mode of the chosen content and another "View from the Beginning" button is provided for viewing the viewing mode of the related content.

Then, a button labelled "Resume Viewing" is arranged in the content detail information image for the viewing mode of the chosen content and the viewing mode of the related content (S1708). The "Resume Viewing" button is provided only for pieces of content that can be viewed. Specifically, when no related content is available, then the "Resume Viewing" button is only provided for the chosen content. Further, when related content is available, a "Resume Viewing" button is provided for viewing the viewing mode of the chosen content and another "Resume Viewing" button is provided for viewing the viewing mode of the related content. In S1710, the metadata processor 1208 extracts text describing the piece of content from the PIs for the chosen content and the related content, generates a content description image in which the extracted text appears, and arranges a content detail information image therein (S1710).

Then, thumbnail images are acquired from the content server 101 for each of the chosen content and the related content and arranged in the content detail information image, navigation buttons and so on for various controls are also arranged therein (S1711), and the process is completed (Return).

(3-4. Position Conversion Process)

The following describes the position conversion process.

Figure 18:
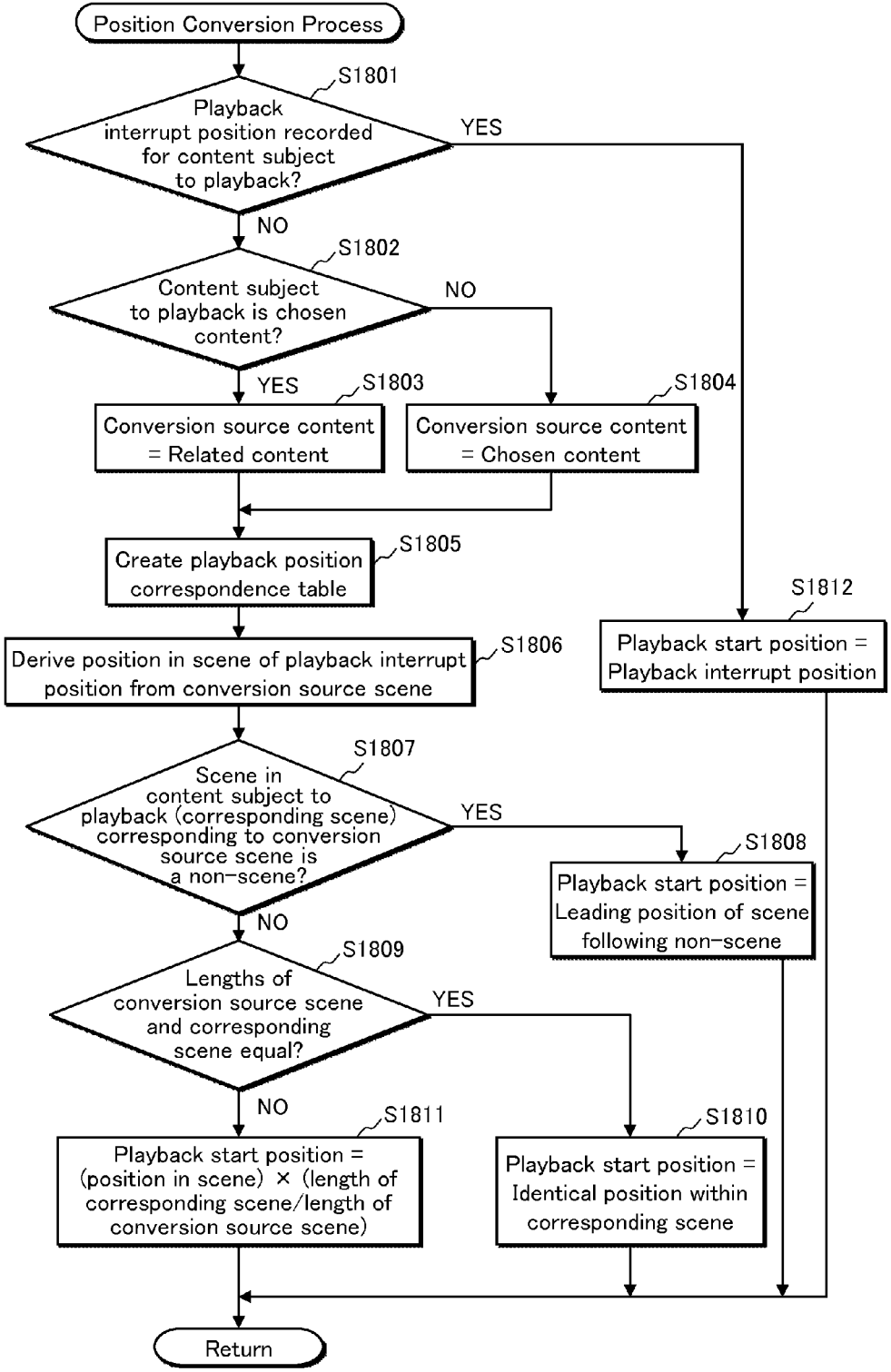
FIG. 18 is a flowchart indicating a position conversion process.

FIG. 18 is a flowchart indicating the position conversion process, corresponding to the aforementioned S1609. First, a determination is made regarding whether or not viewing condition information (i.e., a playback interrupt position) is recorded in the data manager 1206 concerning the piece of content subject to playback (S1801).

In the affirmative case, that is, when a viewing mode prior to interruption and a viewing mode for resuming viewing are the same (YES in S1801), the playback start position is set to the playback interrupt position of the piece of content subject to playback (S1812) and the process ends (RETURN).

In the negative case, that is, when the viewing mode prior to interruption and the viewing mode for resuming viewing are different (NO in S1801), a determination is made regarding whether or not the piece of content subject to playback is the chosen content (S1802). When the piece of content subject to playback is the chosen content (YES in S1802), the related content serves as the conversion source (S1803). When the piece of content subject to playback is not the chosen content, but is the related content, (NO in S1802), the chosen content serves as the conversion source (S1804).

Next, the playback position correspondence table is created (S1805). As mentioned above, the playback position correspondence table creation process requires the ERI of the conversion source content, which is the piece of content from the previous viewing mode, and is acquired. The ERI acquisition step is identical to that already described for S1607 and S1608. That is, the CRID is first extracted from the PI of the piece of content serving as the conversion source. Then, a PL delivery request having the extracted CRID as a parameter is transmitted to the content server 101, and the PL is acquired from the content server 101 in response. The URI of the playback control metafile described in the ProgramURL element within the OnDemandProgram element of the PL is then acquired. Next, a playback control metafile delivery request is made to the acquisition source of the playback control metafile, and the ERI is acquired in response.

The playback position correspondence table is then created using the acquired ERI of the piece of content serving as the conversion source and the ERI of the piece of content subject to playback.

Once the playback position correspondence table has been created, a conversion source scene within which the playback interrupt position is found in the piece of content serving as the conversion source, and a position within the conversion source scene, are derived (S1806). For example, when 3D content A of FIG. 7 is serving as the conversion source and the playback interrupt position is located 400 seconds from the start of 3D content A, then scene B is the scene in which the playback interrupt position is found, and thus serves as the conversion source scene. Also, the playback interrupt position is 100 seconds from the start of scene B, and as such the position within the scene is at 100 s.

Next, the playback position correspondence table is referenced to determine whether or not a scene (hereinafter, corresponding scene) corresponding to the conversion source scene in the piece of content subject to playback is a non-scene. For example, suppose that 2D content A of FIG. 7 is the piece of content subject to playback. In such a case, scene B, which is the conversion source scene in the piece of content serving as the conversion source (i.e., 3D content A), has no corresponding scene in 2D content A, which is the corresponding piece of content subject to playback according to the playback position correspondence table of FIG. 8. That is, the determination is such that the corresponding scene is a non-scene.

When the scene corresponding to the conversion source scene is a non-scene (YES in S1807), the playback interrupt position is converted into a playback start position that is the leading position of a scene that follows the non-scene (S1808).

For example, regarding scene B of the 3D content, the leading position of scene C (at 301 s), which follows the non-scene in the content subject to playback, is used as the playback start position as a result of the position conversion.

When the corresponding scene is not a non-scene (NO in S1807), a determination is made regarding whether or not the lengths of the conversion source scene and the corresponding scene are identical (S1809). In the affirmative case (YES in S1809), a position in the corresponding scene matching the interrupt position is used as the playback start position (S1810).

For example, with reference to FIG. 7, suppose that the conversion source scene is scene C of 3D content A, that the interrupt position therein is at 100 s, and that the corresponding scene is scene C of 2D content A. In such a case, the playback start position is a position 100 seconds from the start of scene C, which is the corresponding scene.

When the lengths of the conversion source scene and the corresponding scene are not identical (NO in S1809), the playback start position is calculated according to the following formula (S1811).

Playback Start Position=(Scene Position)×(Corresponding Scene Length/Conversion Source Scene Length)

For example, with reference to FIG. 7, suppose that the conversion source scene is scene D of 3D content A, that the interrupt position therein is at 100 s, and that the corresponding scene is scene D' of 2D content A.

In such a case, the playback start position is at (100 s)×(200 s/400 s) in the corresponding scene (i.e., scene D'), that is, 50 seconds from the start of scene D'.

(3-5. Example and Operational Explanation of View Interrupt and Resume Processes)

The following provides an example and explanation of a view interrupt process and a view resume process, with reference to FIGS. 15 through 18.

The following explanation presupposes that the view interrupt process occurs while content playback device 102 is playing back a piece of content having the title 3D Action Movie A (i.e., 3D content A), and the playback thereof is interrupted. Also, the view resume process occurs when content playback device 103 plays back 3D content A in a different viewing mode. That is, content playback device 103 plays back 2D content A, which is the related content.

The details have already been explained with reference to FIGS. 15 through 18. As such, the following explanations are simplified where appropriate by omitting the details of previously-discussed steps.

(1) View Interrupt Process

First, the user inputs a user instruction of a content list display request using the input receiver 1202 of content playback device 102 (S1501).

The metadata processor 1208 of content playback device 102 receives a notification from the input receiver 1202 regarding the content list display request, makes a PI acquisition request to the content server 101 (S1502), and obtains the PI in response (S1503).

The metadata processor 1208 generates the content list image according to the PI, as illustrated by FIG. 14A, and displays the image as a GUI (S1504).

The user uses the input receiver 1202 of content playback device 102 to choose 3D content A as the chosen content (S1505). Note that 3D content A is not indicated in FIG. 14A.

Next, the metadata processor 1208 displays the content detail information image for the chosen content (S1506).

The content detail information image displays selection buttons labelled "View (2D)" and "View (3D)". Selecting the "View (2D)" button plays back the related content, and selecting the "View (3D)" button plays back the chosen content.

Suppose that the user selects the "View (3D)" button (S1507). Accordingly, the piece of content subject to playback is specified as being the chosen content.

The metadata processor 1208 acquires the PL for the chosen content from the content server 101 (S1508, S1509). The metadata processor 1208 then analyses the PL and identifies the source URI of the playback control metafile for 3D content A (S1510).

Next, the source URI of the playback control metafile is accessed and the playback control metafile is obtained (S1511, S1512). The metadata processor 1208 then analyses the PL and identifies the source URI of 3D content A (S1513).

The metadata processor 1208 then specifies the playback start position for the piece of content subject to playback (S1514). Given that 3D content A has not yet been viewed, the playback start position is zero (i.e., from the beginning).

Also, given that 3D content A has not yet been viewed, no playback interrupt position has been transmitted from the content server 101 with the PI for 3D content A in S1503. Accordingly, no viewing condition information is recorded in the data manager 1206 for 3D content A.

The metadata processor 1208 then makes a content delivery request for the piece of content subject to playback. In response the audiovisual player 1207 acquires and plays back the piece of content subject to playback (S1515-S1518).

Then, when the playback of 3D content A has reached 400 s, for example, the user uses the input receiver 1202 of content playback device 102 to input a user instruction for interrupting content delivery (S1518).

In such a case, the metadata processor 1208 transmits a delivery interrupt request to the content server 101, having as parameters the user ID, the CRID of the piece of content that has been interrupted, the device ID (i.e., D01), viewing mode information (i.e., 3D), and playback interrupt position information indicating the chronological position at which the piece of content was interrupted at the delivery target (i.e., 400 s) (S1520). The content server 101 writes the parameters of the delivery interrupt request into the interrupt position information table. An example of the interrupt position information table is shown in FIG. 11.

(2) View Resume Process

First, the user inputs a user instruction of a content list display request using the input receiver 1202 of content playback device 103 (S1501).

The metadata processor 1208 of content playback device 103 receives a notification from the input receiver 1202 regarding the content list display request, makes a PI acquisition request to the content server 101 (S1502), and obtains the PI in response (S1503).

Here, the content server 101 stores a interrupt position information table for 3D content A. When the PI of 3D content A is transmitted with the PI, the playback interrupt position information indicating the chronological position (i.e., 400 s) at which 3D content A has been interrupted and the device ID (i.e., D01) of the device on which viewing was interrupted, in association. The metadata processor 1208 stores the playback interrupt position information and the device ID, in addition to the CRID of 3D content A according to the PI and the CRID of 2D content A which is the related content written in the PI, as viewing condition information. An example of such viewing condition information is given in FIG. 13A.

The metadata processor 1208 generates the content list image according to the PI, as illustrated by FIG. 14A, and displays the image as a GUI (S1504).

The user uses the input receiver 1202 of content playback device 103 to choose 2D content A as the chosen content (S1505).

Next, the metadata processor 1208 displays the content detail information image for the chosen content (S1506). When the viewing condition information is stored for the related content (YES in S1506 and S1706), the metadata processor 1208 determines that one of the chosen content and the related content has been interrupted during viewing, and arranges buttons on the content detail information image respectively labelled "View from the Beginning (2D)", "View from the Beginning (3D)", "Resume Viewing (2D)", and "Resume Viewing (3D)" (S1707, S1708).

Suppose that the user selects the "Resume Viewing (2D)" button (S1507). Accordingly, the piece of content subject to playback is specified as being the chosen content.

The metadata processor 1208 acquires the PL for the chosen content from the content server 101 (S1508, S1509). The metadata processor 1208 then analyses the PL and identifies the source URI of the playback control metafile for 2D content A, which is the piece of content subject to playback (S1510).

Next, the metadata processor 1208 accesses the source URI of the playback control metafile, and obtains the playback control metafile (S1511, S1512). According to the ERI of the playback control metafile, the playback position correspondence table for 2D content A is transmitted from the content server 101 to content playback device 103. The metadata processor 1208 of content playback device 103 stores the playback position correspondence table in the data manager 1206.

The metadata processor 1208 then analyses the PL and identifies the source URI of 2D content A (S1513).

The metadata processor 1208 then specifies the playback start position for 2D content A, which is the piece of content subject to playback (S1514).

The specification of the playback start position is explained below, with reference to FIGS. 16 and 18.

Firstly, the playback start mode is resuming viewing (YES in S1609).

Also, no viewing condition information (i.e., playback interrupt position) is stored in the data manager 1206 for the piece of content subject to playback (NO in S1611 and S1801). Further, the piece of content subject to playback is the chosen content (YES in S1802), and the conversion source content is the related content (S1803).

At this point, the metadata processor 1208 reads the playback interrupt position (400 s) of the conversion source content (i.e., 3D content A) from the data manager 1206. Then, the conversion source scene in which the playback interrupt position is found (i.e., scene B according to FIG. 7) and the position in the scene at which the playback interrupt position is found (i.e., 100 s) are derived (S1806).

Reference to the playback position correspondence table indicates that the scene corresponding to the conversion source scene in the piece of content subject to playback (i.e., the corresponding scene) is a non-scene (YES in S1807). Thus, the metadata processor 1208 determines that the leading position of scene C (i.e., 300 s in scene C), which is the scene following the non-scene in the piece of content subject to playback, is to serve as the playback start position (S1808).

When another non-scene occurs after the non-scene, then the leading position of the first scene that is not a non-scene after the original non-scene is determined as the playback start position.

Once the playback start position has been specified, the metadata processor 1208 makes a content delivery request to the content server 101 so as to play back the piece of content subject to playback from the playback start position, and obtains the piece of content subject to playback in response. The audiovisual player 1207 then plays back the piece of content subject to playback from the playback start position (S1612, S1613).

As described above, 3D content A, which has been partially viewed on content playback device 102, can be played back smoothly on content playback device 103 despite playback resuming in a different viewing mode, without duplication of portions identical to portions viewed prior to interruption and without skipping any unviewed portions.

(4. Variations)

The above Embodiment has described a content delivery system pertaining to the present disclosure. However, no limitation to the above-described content delivery system is intended. The following variations may also be applied.

(1) In the above-described Embodiment, the network 104 need only be able to transmit and receive data. For example, a contents delivery network, the Internet, or a wired network of private lines may be used.

(2) In the above-described Embodiment, the content playback devices making up the content delivery system 100 are the content playback devices 102 and 103 only. However, three or more content playback device may also be used.

Here, for example, suppose that a piece of content has been interrupted during playback on two of the content playback devices, that the playback interrupt position differs therebetween, and that playback is then resumed on a third content playback device. In such a case, the most recent playback interrupt position is used for the conversion into the playback start position.

(3) In the above-described Embodiment, termID numbers 22.1 and 22.2 have been added to the IPTVSERVICEHowRelatedCS dictionary as shown in FIG. 6. However, the additions are not limited to these examples. Further updates may also be performed, as needed. For example, termID numbers of 22.3 and so on may be defined for alternate viewing modes, or may be defined for video content providing an additional viewpoint for a multi-view mode, content using a different codec, and so on.

(4) In the above-described Embodiment, content playback device 102 uses one each of the video decoder 1204 and the video output 1205. However, no such limitation is intended. Any number of these components may used provided that the delivered video packets are decoded. For example, content playback device 102 may include a plurality of video decoders and video outputs. For 3D video, separate elementary streams may be delivered for each of a left-view video and a right-view video, and a plurality of decoders and video outputs may be used therefor.

(5) In the above-described Embodiment, the RelatedMaterial element of the PI is used to describe link information to similar content in a different viewing mode. However, no limitation is intended, provided that the information pertaining to the similar content in a different viewing mode is described.

For example, a new element or attribute may be added to the PI and playback control metafile of the ECG metadata in order to describe link information. Alternatively, the interpretation of a currently-defined element or attribute may be expanded to enable describing link information therewith. Further, similar content having different viewing modes may be grouped using the GI of the ECG metadata. Also, one PI may be used for a group of similar content having different viewing modes, and that PI may have an expansion enabling the description of a URL for a plurality of PLs, one for each viewing mode.

(6) In the above-described Embodiment, an example is given in FIG. 7 indicating a piece of content as delimited into scenes. However, no such limitation is intended. The piece of content may also be delimited according to a fixed standard, provided that association is possible between corresponding scenes in different pieces of content.

(7) In the above-described Embodiment, the content playback devices 102 and 103 are configured similarly. However, the content playback devices may have different playback capabilities or otherwise differ in terms of display capabilities. For example, content playback device 102 may be a fixed device capable of high-definition playback, while content playback device 103 may be, for example, a tablet terminal lacking 3D playback capabilities.

Here, for example, the data manager 1206 of content playback device 103 may store playback capability information indicating the viewing mode (2D) that content playback device 103 is capable of playing back. Reference to such playback capability information enables a device to identify a viewing mode playable thereby. The playback capability information for content playback device 102 may also be stored in the data manager 1206 of content playback device 102 to indicate the viewing modes (both 2D and 3D) that can be played back thereby.

Further, in the view resume process, described in section (2) under the heading Example and Operational Explanation of View Interrupt and Resume Processes, the user uses the input receiver 1202 of content playback device 102 to choose 2D content A as the chosen content. However, reference to the playback capability information may also be used to find that content playback device 103 is not capable of 3D playback.

Thus, the GUI of content playback device 103 does not display buttons for 3D playback, such as "View from the Beginning (3D)" and "Resume Viewing (3D)", or has such buttons greyed-out so as to prevent selection of this viewing mode.

Also, when only one viewing mode (e.g., 2D) is described in the playback capability information for content playback device 103, then the choice of viewing mode may be determined as 2D without user input.

(8) In the above-described Embodiment, when the length of the conversion source scene and the length of the corresponding scene are found to be different in S1809 (NO in S1809), the playback start position is calculated (S1811) according to the following formula.

Playback Start Position=(Scene Position)×(Corresponding Scene Length/Conversion Source Scene Length)

However, any appropriate conversion may applied according to the nature of the content. For example, as mentioned in the processing of S1810, a matching position in the corresponding scene may be used as the playback start position. Alternatively, the leading position of the corresponding scene may be used as the playback start position.

(9) In the above-described Embodiment, content playback device 102 acquires the ECG metadata of the required PIs and so on from the content server 101 when making the content list image request. However, no limitation is intended provided that the ECG metadata is usable. For example, content playback device 102 may instead obtain the ECG metadata in advance and handle management thereof. Also, rather than obtain all necessary ECG metadata from the content server 101, the ECG metadata may be stored in whole or in part by content playback device 102 in order to extract necessary data for use as needed.

(10) In the above-described Embodiment, a GUI as shown in FIGS. 14B and 14C is used to simultaneously make the content viewing request, select the viewing mode, and choose whether to view from the beginning or to resume viewing. However, no such limitation is intended, provided that the content viewing request is made, the viewing mode is selected, and the choice of whether to view from the beginning or to resume viewing is made. For example, a GUI for selecting the viewing mode may be displayed upon pressing a button for making the view request. Then, once the viewing mode is selected, a GUI for selecting whether to view from the beginning or to resume viewing may be displayed. The user thus makes gradual selections using the GUI.

(11) In the above-described Embodiment, the viewing mode of the related content is known by referencing the RelatedMaterial element of the PI for the chosen content, and the viewing mode of the chosen content is known by referencing the RelatedMaterial element of the PI for the related content. However, no such limitation is intended, provided that the viewing modes for the chosen content and the related content are knowable.

For example, a coding element within the VideoAttributes elements of the PI for the chosen content may be referenced, and the viewing mode may be determined from a codec described therein. Presently, the IPTVSERVICEVisualCodingFormatCS dictionary, defined in IPTVFJ STD-0006 and so on, is only able to designate MPEG-2 and AVC. However, an expansion to the IPTVSERVICEVisualCodingFormatCS dictionary may be used to enable designation of MVC and so on. As such, the viewing mode determination is possible with reference to this element.

Further, a new element may be defined within the PI and used to describe a plurality of viewing modes pertaining to similar pieces of content having different viewing modes.

(12) In the above-described Embodiment, the playback position correspondence table describes a correspondence relationship between scenes (or chapter units) in pieces of content, as per the example of playback position correspondence table 801. However, no limitation is intended provided that information is described enabling a playback position in different pieces of similar content to be obtained.

For example, as shown in FIG. 21, the playback position correspondence table may involve information indicating a playback position in a given piece of content that corresponds to a playback position in another piece content, without scene units.

For example, playback position correspondence table 2101 indicates a plurality of pairs each including a playback time in a piece of content for a certain viewing mode, and a playback time in a corresponding piece of content for another viewing mode.

When a video product is only available in a single piece of content, the corresponding playback time in the other piece of content is given as a dash to indicate non-existence. Also, playback position correspondence table 2101 is given in 100-second intervals. However, shorter intervals provide greater specific precision for the playback start position.

Further, although playback position correspondence table 2101 is given in equally-spaced 100-second intervals, the intervals need not necessarily be equal. The content provider may create the intervals in consideration of content specifics.

(13) In the above-described Embodiment, the playback start position is acquired immediately prior to the content delivery request. However, no such limitation is intended. The playback start position may be acquired at any time prior to the content delivery request.

(14) In the above-described Embodiment, the playback start position is acquired immediately prior to the content delivery request by having content playback device 102 perform a position conversion process. However, no such limitation is intended provided that the playback start position is acquired. For example, the position conversion process may be performed by the content server 101 instead.

Figure 19:
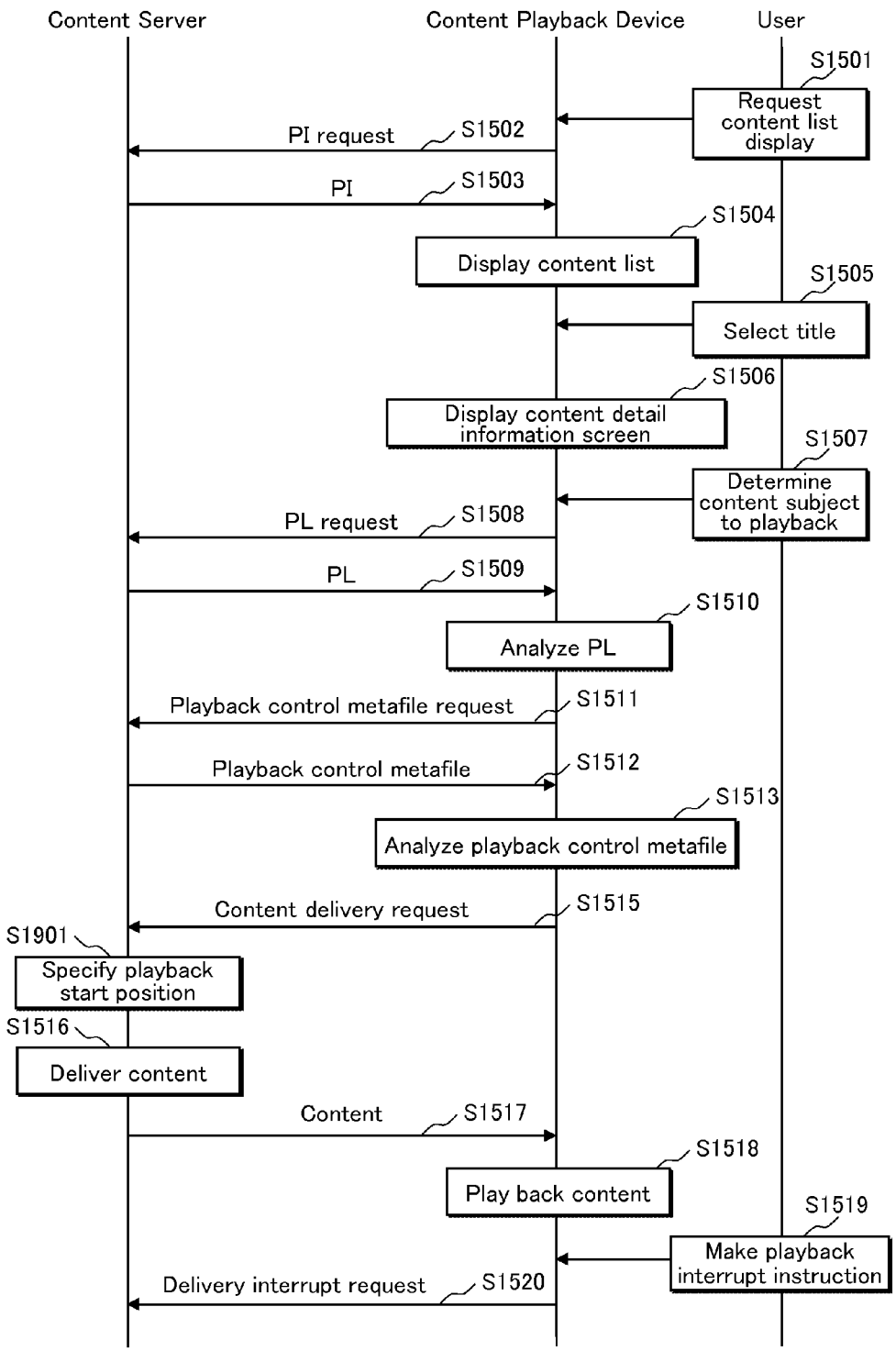
FIG. 19 is a flowchart of the overall operations performed to play back content when the content server performs the position conversion process, pertaining to a variation.

FIG. 19 is a flowchart of the overall operations performed to play back content when the content server 101 performs the position conversion process. FIG. 19 is very similar to FIG. 15, differing in that S1514, performed by the content playback device in FIG. 15, is replaced by S1901, which is performed by the content server. The playback start position specifying processes of S1514 and S1901 are similar in content.

When making the content delivery request (S1515), content playback device 102 makes a content delivery request to the content server 101, having as arguments the playback interrupt position, the CRID of a piece of content pertaining to the viewing mode during which interruption occurred, and the CRID of a piece of content pertaining to the viewing mode now requested for viewing.

The content server 101 specifies the playback start position based on the acquired arguments (S1901), and performs content delivery beginning from the specified playback start position (S1516).

In FIG. 19, content server 101 sequentially receives the content delivery request (S1515), performs the playback start position specification process (S1901), and performs content delivery (S1516). However, no limitation to this sequence is intended, provided that the content server 101 is able to specify the playback start position.

Figure 20:
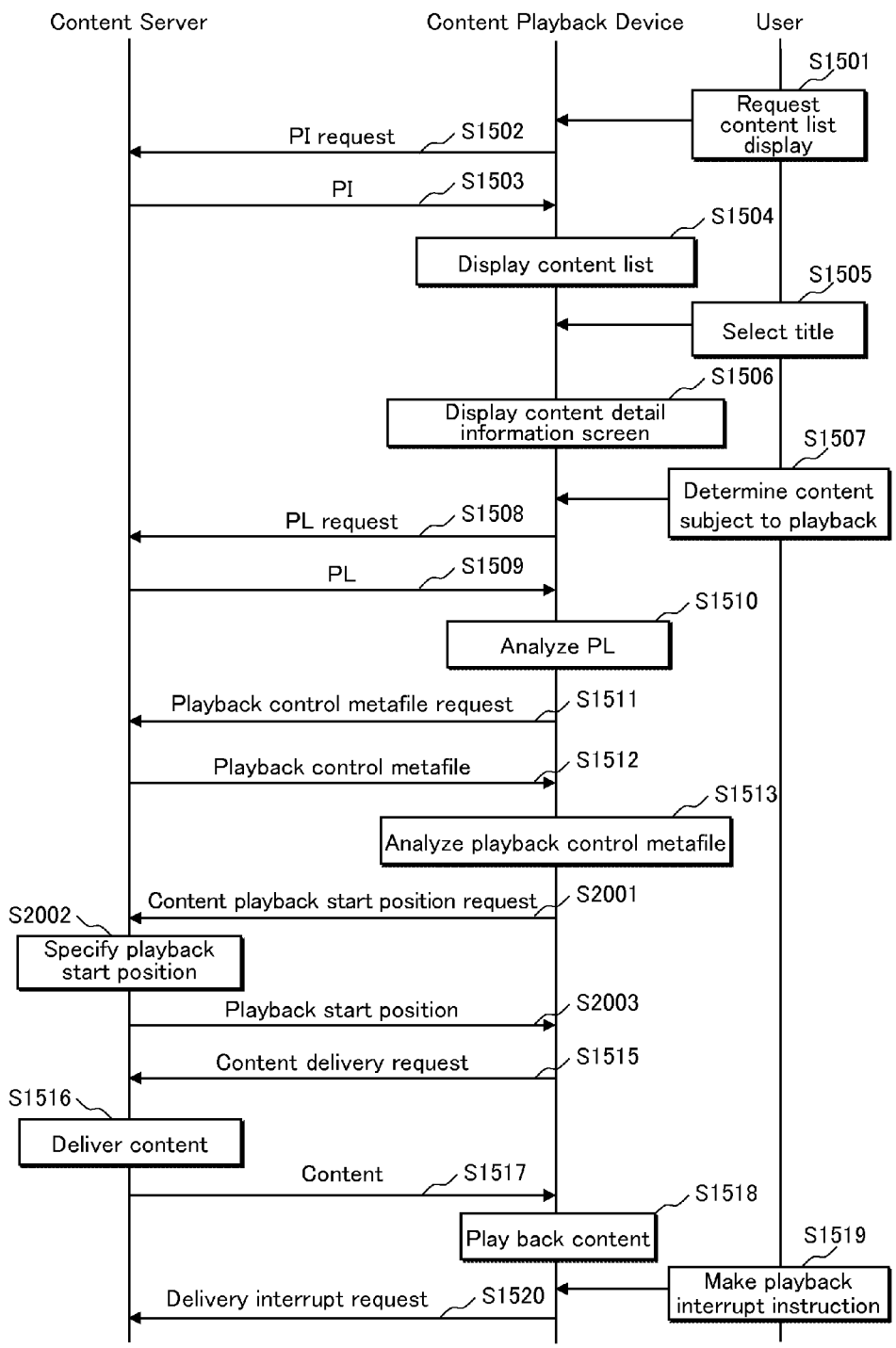
FIG. 20 is a flowchart of the overall operations performed to play back content when the content server performs the position conversion process, pertaining to a variation.

For example, as indicated in FIG. 20, content server 101 may receive a content playback start position request (S2001), acquire the playback start position by performing a playback start position specification process (S2002), and then notify content playback device 102 of the playback start position so acquired (S2003). Then, content playback device 102 may make the content delivery request (S1515) to the content server 101 based on the playback start position in the notification.

(15) The above-described Embodiment is not intended to limit the data stored by the data manager 1206. Additional data may be stored, depending on the storage capacity.

For example, the data manager 1206 may store all elements and attribute information of the ECG metadata, or may store only the elements and attribute information deemed necessary for display, content management, and so on. Also, the duration of data storage, the number of pieces of ECG metadata stored at any given time, and so on, may be determined according to system requirements.

(16) In the above-described Embodiment, the HR dictionary is found on the content server. However, no limitation is intended, provided that the HR dictionary is searchable. For example, the content playback devices 102 and 103 may store and search the dictionary.

(17) In the above-described Embodiment, the playback start position is acquired using a playback position correspondence table. However, no such limitation is intended, provided that the playback start position is available.

For example, content playback device 102 may store and use a conversion formula for converting a position in the conversion source content into a playback start position for the piece of content subject to playback, such that the formula produces equivalent results to those obtained using the playback position correspondence table discussed in the above-described Embodiment.

(18) In the above-described Embodiment, a scene length of zero in the ERI illustrated in FIG. 10 indicates that the corresponding scene (e.g., a scene having a number attribute of two in the chapter element) is not present in the piece of content (e.g., Action Movie A), or is otherwise invalid. The reason for this effect is that, as per Digital TV Information Research Group, Networked Digital Television Specifications for Streaming, Codec chapter version 1.2, published Dec. 21, 2010, scene numbers in the number attribute of the chapter element are sequentially assigned and defined for integers one and up. Thus, the numbers in the chapter element are allocated without skipping.

When such restrictions are not in place, then as shown in FIG. 22, no chapter element has a value of two for the number attribute. Accordingly, the scene having the number attribute of two (i.e., a scene corresponding to scene B from 3D Action Movie A) is expressed as being unavailable in Action Movie A.

Also, as shown in FIG. 23, an attribute indicating that a given element within the chapter element is invalid (e.g., a value of invalid) may be added to indicate that the scene in question is not present or otherwise invalid for the piece of content.

Further, a new element may be defined in the ERI in order to express a correspondence relationship between positions in different pieces of content equivalent to the present variation.

(19) In the above-described Embodiment, the correspondence relationship between positions in pieces of content having different viewing modes is described in the ERI. However, no limitation is intended provided that the correspondence relationship is described.

For example, a piece of ECG metadata may include a SegmentInformationTable (defined in ARIB STD-B38) that indicates the correspondence relationship between positions in pieces of content having different viewing modes.

FIG. 24 illustrates an excerpt of a SegmentInformationTable for 3D Action Movie A, where the content is configured as shown in FIG. 7.

FIG. 25 illustrates an excerpt of a SegmentInformationTable for Action Movie A, where the content is configured as shown in FIG. 7.

Here, the SegmentInformationTable for 3D Action Movie A and the SegmentInformationTable for Action Movie A are written such that SegmentInformation elements for equivalent scenes are identical in assignment order.

Also, the SegmentInformationTable for Action Movie A shown in FIG. 25 is such that the SegmentLocator element within the second SegmentInformation element has the same value as the SegmentLocator element within the third SegmentInformation element.

This indicates that the length (duration) of the video having the second SegmentInformation element is zero, and thus that the video does not exist. In other words, Action Movie A does not contain video corresponding to the second SegmentInformation element of the SegmentInformationTable for 3D Action Movie A.

Then, content playback device 102 is able to create information equivalent to the playback position correspondence table 801 from the SegmentInformationTable given for 3D Action Movie A and for Action Movie A.

(20) Rather than associate the SegmentInformation elements of 3D Action Movie A and Action Movie A in order of appearance as discussed above in Variation (19), the SegmentInformation element may include a RelatedMaterial element and, as shown in FIG. 26, make a direct association using the RelatedMaterial element.

FIG. 26 indicates that the href attribute value of the HowRelated element for scene A reads http://www.iptvforum.jp/cs/2011/07/IPTVSERVICEHowRelatedCS:22.2. This indicates that the SegmentInformation related to scene A pertains to 2D playable content in another viewing mode. Such segmentation is specified by the MediaUri element value of crid://aaa.ne.jp/content/ABCDE0001/SegmentInformation/1.

As explained above, the RelatedMaterial element is able to describe the association between the SegmentInformationTable for each of 3D Action Movie A and Action Movie A.

(21) In the above-described Embodiment, examples given mainly pertain to Video-on-Demand. However, the present disclosure is also applicable to a download service in which content is downloaded and then played back.

In a download service, the content is first downloaded by the content server 101, and content playback device 102 then plays back the already-downloaded content rather than making a content delivery request to the content server 101.

(22) In the above-described Embodiment, content playback device 102 acquires the ECG metadata and creates a content list image using the acquired ECG metadata. However, no such limitation is intended provided that the content list image is created.

For example, the content server 101 may create a BML document representing the content list image, and content playback device 102 may acquire and interpret the BML document to display the content list image.

(23) In the above-described Embodiment, S1520 involves content playback device 102 transmitting playback interrupt position information to the content server 101 as a parameter. However, no such limitation is intended provided that the content server 101 has access to the playback interrupt position. For example, the content server 101 may store a position at which content delivery as been interrupted as playback interrupt position information.

(24) In the above-described Embodiment, the content server manages the playback interrupt position so as to enable playback to be resumed on a content playback device different than a content playback device on which playback has previously been interrupted. However, no limitation is intended. When the user has only one content playback device, the playback interrupt position may be managed by that content playback device. Also, in such a case, the user ID and device ID are unnecessary. Thus, only the CRID, viewing mode information, and playback interrupt position information require managing.

(25) The content playback process, the content detail information image creation process, the position conversion process, and so on of the above-described Embodiment may be realised by having a processor of the content playback devices 102 and 103, or various circuits connected to the processor, execute a control program of program code written in machine language or a high-level programming language, the control program being recorded on a recording medium or distributed and delivered through a communication pathway. The aforementioned recording medium may be any of an IC card, a hard disk, an optical disc, a floppy disc, ROM, flash memory, and so on. The delivered and distributed control program is provided for use by storing in memory or the like that is readable by a processor, and the various functions described in the above-described Embodiment are realised by having the processor execute the control program. The processor may execute the control program directly, or may first compile or interpret the program before execution.

(26) The functional components discussed in the above-described Embodiment (i.e., the data distributor 201, the delivery controller 202, the content manager 203, the data acquirer 1201, the input receiver 1202, the demultiplexer 1203, the video decoder 1204, the video output 1205, the data manager 1206, the audiovisual player 1207, the metadata processor 1208, and the display 1209) may be realised as circuits realising the functions, or may be realised as one or more processors executing a program.

The aforementioned functional components are realised as an LSI, which is a typical integrated circuit. The components may each be realised as a separate chip, or may be realised on a single chip that includes all or a subset of the components. Although LSI is specifically mentioned, the terms IC, system LSI, super LSI, and ultra LSI may apply according to the degree of integration. Also, the method of integration is not limited to LSI. A private circuit or general-purpose processor may also be used. Additionally, a Field Programmable Gate Array or reconfigurable processor may be employed after LSI manufacture. Further, should future advances be made in semiconductor technology or some other developing field that replaces LSIs, such technology will of course be applicable to the integration of the functional blocks. Biotechnology applications are also possible.

(27) The above-described Embodiment and variations may be modularly combined.

(5. Supplement)

Further aspects of the present disclosure are described below, in terms of the content playback device configuration and variations and effects thereof.

(1) In one aspect, a content playback device receives and plays back streaming content from a content server delivering two pieces of content each having a different viewing mode for a common product, the content playback device comprising: a selection unit selecting a viewing mode; a determination unit determining whether or not playback of a first piece of content has been interrupted, the first piece of content having another viewing mode that is not the selected viewing mode; a conversion unit converting, when the determination unit has determined that playback of the first piece of content has been interrupted, a position at which playback of the first piece of content has been interrupted into a corresponding position in a second piece of content having the selected viewing mode; and a request unit making a request to the content server for transmission of the second piece of content beginning at the corresponding position.

According to the above configuration, playback is resumed from a corresponding position in the second piece of content that corresponds to the position in the first piece of content at which playback was interrupted. Thus, the video prior to playback being interrupted corresponds to the video at which playback is resumed, providing less discomfort to the user than conventional technology.

(2) In another aspect, the conversion unit has a correspondence table of correspondence between a plurality of positions in the first piece of content and a plurality of positions in the second piece of content, and the conversion unit performs conversion by reading the corresponding position from the correspondence table, the corresponding position being in the second piece of content and corresponding to the position at which playback has been interrupted.

According to this configuration, a correspondence table is definable in advance and indicates correspondence between a plurality of positions in the first piece of content and in the second piece of content, enabling the corresponding position to be derived by reference to the correspondence table.

(3) In a further aspect, the first piece of content and the second piece of content are each divided into a plurality of scenes, the correspondence table indicates correspondence between the scenes of the first piece of content and the scenes of the second piece of content, and the conversion unit performs conversion by: specifying a first scene during which playback has been interrupted and a first position, within the first scene, at which playback has been interrupted; referencing the correspondence table and acquiring therefrom a second scene, within the second piece of content, corresponding to the first scene; and determining the corresponding position as a second position, within the second scene, corresponding to the first position.

According to this configuration, a plurality of chronological positions in the first piece of content and the second piece of content are collected into regular scene units for association.

(4) In an additional aspect, when the first scene and the second scene differ in length, the conversion unit calculates the second position as follows:

Second Position=First Position×(Second Scene Length/First Scene Length)

According to this configuration, a chronological position in the first piece of content and a chronological position in the second piece of content can be associated despite a first scene and a second scene corresponding thereto being of different lengths.

(5) In another further aspect, before performing conversion, the conversion unit receives and stores the correspondence table from the content server.

According to this configuration, the chronological positions in the first and second pieces of content are managed by the content server.

(6) In yet another aspect, when the first piece of content has been interrupted during playback on a device associated in advance with the content playback device, the content server stores the position at which playback has been interrupted, and once the viewing mode is selected by the selection unit, the conversion unit acquires the position at which playback has been interrupted from the content server.

According to this configuration, content playback can be resumed with reduced user discomfort in comparison to conventional technology in cases where the device on which content playback has been interrupted is not the content playback device.

(7) In yet a further aspect, the content playback device has playback capability for only one viewing mode among viewing modes of the two pieces of content, and the selection unit selects one of the viewing modes for which there is playback capability.

Also, among the viewing modes, one is a 3D mode and another is a 2D mode.

According to this configuration, the user is spared some work in selecting the viewing mode.

(8) In an alternate aspect, a content playback method used by a content playback device receives and plays back streaming content from a content server delivering two pieces of content each having a different viewing mode for a common product, the content playback device including a selection unit, a determination unit, a conversion unit, and a request unit, the content playback method comprising: a selection step of the selection unit selecting a viewing mode; a determination step of the determination unit determining whether or not playback of a first piece of content has been interrupted, the first piece of content having another viewing mode that is not the selected viewing mode; a conversion step of the conversion unit converting, when the determination unit has determined that playback of the first piece of content has been interrupted, a position at which playback of the first piece of content has been interrupted into a corresponding position in a second piece of content having the selected viewing mode; and a request step of the request unit making a request to the content server for transmission of the second piece of content beginning at the corresponding position.

In another alternate aspect, a content playback system, comprising: a content server streaming two pieces of content each having a different viewing mode for a common product; and a content playback device receiving and playing back streaming content from the content server, the content playback device including: a selection unit selecting a viewing mode; a determination unit determining whether or not playback of a first piece of content has been interrupted, the first piece of content having another viewing mode that is not the selected viewing mode; a conversion unit converting, when the determination unit has determined that playback of the first piece of content has been interrupted, a position at which playback of the first piece of content has been interrupted into a corresponding position in a second piece of content having the selected viewing mode; and a request unit making a request to the content server for transmission of the second piece of content beginning at the corresponding position.

According to the above configuration, playback is resumed from a corresponding position in the second piece of content that corresponds to the position in the first piece of content at which playback was interrupted. Thus, the video prior to playback being interrupted corresponds to the video at which playback is resumed, providing less discomfort to the user than conventional technology.

INDUSTRIAL APPLICABILITY

The content playback device pertaining to an embodiment of the disclosure is able to switch between viewing modes while content is being played back in a manner causing little discomfort to the user, and is thus applicable to a device receiving and playing back streaming content through a network or similar.

REFERENCE SIGNS LIST

100 Content delivery system
101 Content server
102 Content playback device
103 Content playback device
104 Network
201 Data distributor
202 Delivery controller
203 Content manager
1201 Data acquirer
1202 Input receiver
1203 Demultiplexer
1204 Video decoder
1205 Video output
1206 Data manager
1207 Audiovisual player
1208 Metadata processor
1209 Display

The invention claimed is:

1. A content playback device receiving and playing back streaming content from a content server delivering two pieces of content each having a different viewing mode for a common product, the content playback device comprising:
    a selection unit selecting a viewing mode;
    a determination unit determining whether or not playback of a first piece of content has been interrupted, the first piece of content having another viewing mode that is not the selected viewing mode;
    a conversion unit converting, when the determination unit has determined that playback of the first piece of content has been interrupted, a position at which playback of the first piece of content has been interrupted into a corresponding position in a second piece of content having the selected viewing mode; and
    a request unit making a request to the content server for transmission of the second piece of content beginning at the corresponding position, wherein
    when the first piece of content has been interrupted during playback on a device associated in advance with the content playback device, the content server stores the position at which playback has been interrupted, and
    once the viewing mode is selected by the selection unit, the conversion unit acquires the position at which playback has been interrupted from the content server.

2. The content playback device of claim 1, wherein
    the conversion unit has a correspondence table of correspondence between a plurality of positions in the first piece of content and a plurality of positions in the second piece of content, and
    the conversion unit performs conversion by reading the corresponding position from the correspondence table, the corresponding position being in the second piece of content and corresponding to the position at which playback has been interrupted.

3. The content playback device of claim 2, wherein
    the first piece of content and the second piece of content are each divided into a plurality of scenes,
    the correspondence table indicates correspondence between the scenes of the first piece of content and the scenes of the second piece of content, and
    the conversion unit performs conversion by:
        specifying a first scene during which playback has been interrupted and a first position, within the first scene, at which playback has been interrupted;
        referencing the correspondence table and acquiring therefrom a second scene, within the second piece of content, corresponding to the first scene; and
        determining the corresponding position as a second position, within the second scene, corresponding to the first position.

4. The content playback device of claim 3, wherein
    when the first scene and the second scene differ in length, the conversion unit calculates the second position as follows:

Second Position=First Position×(Second Scene Length/First Scene Length).

5. The content playback device of claim 2, wherein
    before performing conversion, the conversion unit receives and stores the correspondence table from the content server.

6. The content playback device of claim 1, having playback capability for only one viewing mode among viewing modes of the two pieces of content, wherein
    the selection unit selects one of the viewing modes for which there is playback capability.

7. The content playback device of claim 6, wherein
    among the viewing modes, one is a 3D mode and another is a 2D mode.

8. A content playback method used by a content playback device receiving and playing back streaming content from a content server delivering two pieces of content each having a different viewing mode for a common product, the content playback device including a selection unit, a determination unit, a conversion unit, and a request unit, the content playback method comprising:
    a selection step of the selection unit selecting a viewing mode;
    a determination step of the determination unit determining whether or not playback of a first piece of content has been interrupted, the first piece of content having another viewing mode that is not the selected viewing mode;
    a conversion step of the conversion unit converting, when the determination unit has determined that playback of the first piece of content has been interrupted, a position at which playback of the first piece of content has been interrupted into a corresponding position in a second piece of content having the selected viewing mode; and
    a request step of the request unit making a request to the content server for transmission of the second piece of content beginning at the corresponding position, wherein
    when the first piece of content has been interrupted during playback on a device associated in advance with the content playback device, the content server stores the position at which playback has been interrupted, and once the viewing mode is selected by the selection unit, the conversion unit acquires the position at which playback has been interrupted from the content server.

9. A content playback system, comprising:

a content server streaming two pieces of content each having a different viewing mode for a common product; and a content playback device receiving and playing back streaming content from the content server, the content playback device including:

a selection unit selecting a viewing mode;

a determination unit determining whether or not playback of a first piece of content has been interrupted, the first piece of content having another viewing mode that is not the selected viewing mode;

a conversion unit converting, when the determination unit has determined that playback of the first piece of content has been interrupted, a position at which playback of the first piece of content has been interrupted into a corresponding position in a second piece of content having the selected viewing mode; and a request unit making a request to the content server for transmission of the second piece of content beginning at the corresponding position, wherein when the first piece of content has been interrupted during playback on a device associated in advance with the content playback device, the content server stores the position at which playback has been interrupted, and once the viewing mode is selected by the selection unit, the conversion unit acquires the position at which playback has been interrupted from the content server.

* * * * *